United States Patent
Okanishi et al.

(10) Patent No.: US 8,663,872 B2
(45) Date of Patent: Mar. 4, 2014

(54) METHOD FOR MANUFACTURING MEMBRANE-MEMBRANE REINFORCING MEMBER ASSEMBLY, MEMBRANE-CATALYST LAYER ASSEMBLY, MEMBRANE-ELECTRODE ASSEMBLY, AND POLYMER ELECTROLYTE FUEL CELL

(75) Inventors: Takeou Okanishi, Osaka (JP); Yoshihiro Hori, Nara (JP); Kazuhito Hatoh, Osaka (JP)

(73) Assignee: Panasonic Corporation, Osaka (JP)

( * ) Notice: Subject to any disclaimer, the term of this patent is extended or adjusted under 35 U.S.C. 154(b) by 930 days.

(21) Appl. No.: 12/067,130

(22) PCT Filed: Sep. 14, 2006

(86) PCT No.: PCT/JP2006/318281
§ 371 (c)(1),
(2), (4) Date: Oct. 29, 2008

(87) PCT Pub. No.: WO2007/032442
PCT Pub. Date: Mar. 22, 2007

(65) Prior Publication Data
US 2009/0181277 A1    Jul. 16, 2009

(30) Foreign Application Priority Data

Sep. 15, 2005 (JP) .................................. 2005-268895

(51) Int. Cl.
*H01M 2/16* (2006.01)
*H01M 2/18* (2006.01)
*H01M 8/00* (2006.01)
*H01M 8/10* (2006.01)

(52) U.S. Cl.
USPC ........... 429/535; 429/481; 429/483; 429/492; 429/509; 427/115

(58) Field of Classification Search
USPC .................. 429/30, 481, 483, 492, 509, 535; 427/115
See application file for complete search history.

(56) References Cited

U.S. PATENT DOCUMENTS

| | | | |
|---|---|---|---|
| 6,197,147 B1 * | 3/2001 | Bonsel et al. ................. | 156/269 |
| 2005/0064261 A1 * | 3/2005 | Breault et al. .................. | 429/32 |

FOREIGN PATENT DOCUMENTS

JP        62-5569        1/1987
(Continued)

OTHER PUBLICATIONS

Yamazaki et al., Machine translation of JP2003068318 A, Mar. 2003.*

(Continued)

*Primary Examiner* — Sean P Cullen
(74) *Attorney, Agent, or Firm* — McDermott Will & Emery LLP

(57) ABSTRACT

A membrane-membrane reinforcing member assembly (1) of the present invention includes: a polymer electrolyte membrane (10) having a pair of first main surface (F1) and second main surface (F2) which face each other and each has a substantially rectangular shape; a pair of first membrane reinforcing members 22 and 24 which are disposed on portions, respectively, extending along a pair of opposed sides of four sides of the first main surface (F1), each has a main surface smaller than the first main surface (F1) and each has a film shape; and a pair of second membrane reinforcing members (26) and (28) which are disposed on portions, respectively, extending along a pair of opposed sides of four sides of the second main surface (F2), each has a main surface smaller than the second main surface (F2) and each has a film shape, wherein the pair of first membrane reinforcing members (22) and (24) and the pair of second membrane reinforcing members (26) and (28) are disposed so as to extend along four sides as a whole, respectively, of the polymer electrolyte membrane (10) and so as to sandwich four corners of the polymer electrolyte membrane (10).

6 Claims, 14 Drawing Sheets

(56) References Cited

FOREIGN PATENT DOCUMENTS

| | | | |
|---|---|---|---|
| JP | 05-021077 | | 1/1993 |
| JP | 05242897 A | * | 9/1993 |
| JP | 10154521 A | * | 6/1998 |
| JP | 2003-68318 | | 3/2003 |
| JP | 2004-247123 | | 9/2004 |
| JP | 2004-303627 | | 10/2004 |
| JP | 2005-216769 | | 8/2005 |
| KR | 2006000438 A | * | 1/2006 |

OTHER PUBLICATIONS

Terada et al., Machine translation of JP 2005216769 A, Jun. 2005.*
Kweon et al., Machine translation of KR 2006000438 A, Jan. 2006.*
Sugiyama, T., Machine translation of JP 05-242897 A, Sep. 1993.*
Fukuoka et al., Machine translation of JP 10-154521 A, Jun. 1998.*
English translation and translator's declaration for JP 62-5569.

* cited by examiner

METHOD FOR MANUFACTURING MEMBRANE-MEMBRANE REINFORCING MEMBER ASSEMBLY, MEMBRANE-CATALYST LAYER ASSEMBLY, MEMBRANE-ELECTRODE ASSEMBLY, AND POLYMER ELECTROLYTE FUEL CELL

RELATED APPLICATIONS

This application is the U.S. National Phase under 35 U.S.C. §371 of International Application No. PCT/JP2006/318281, filed on Sep. 14, 2006, which in turn claims the benefit of Japanese Patent Application No. JP 2005-268895, filed on Sep. 15, 2005, the disclosures of which Applications are incorporated by reference herein.

TECHNICAL FIELD

The present invention relates to a membrane-membrane reinforcing member assembly, a membrane-catalyst layer assembly, a membrane-electrode assembly, a polymer fuel cell, and manufacturing methods thereof.

BACKGROUND ART

A polymer electrolyte fuel cell causes a fuel gas, such as hydrogen, and an oxidizing gas, such as air, to electrochemically react with each other by a gas diffusion layer electrode including a catalyst layer, such as platinum, and generates electricity and heat at the same time. The configuration of the polymer electrolyte fuel cell is as follows. First, a catalyst layer is formed on each of both surfaces of a polymer electrolyte membrane which selectively transports hydrogen ions. The catalyst layer is formed by forming a catalyst body that is carbon powder supporting platinum based metal catalyst and mixing the catalyst body with hydrogen ion conductive polymer electrolyte. Next, a gas diffusion layer having fuel gas permeability and electron conductivity is formed on an outer surface of the catalyst layer. The gas diffusion layer is formed by, for example, carbon paper which is subjected to water repellent finish. A combination of the catalyst layer and the gas diffusion layer is called a gas diffusion electrode.

Next, a gas sealing material or a gasket is disposed on the circumference of the electrode with the polymer electrolyte membrane disposed therebetween so that the fuel gas for supplying fuel does not leak outside, and the fuel gas and the oxidizing gas do not mix with each other. The sealing material or the gasket is integrated with the electrode and the polymer electrolyte membrane, and this is called an MEA (membrane-electrode assembly). An electrically-conductive separator is disposed outside the MEA to mechanically fix the MEA and electrically connect the MEA with the adjacent MEA in series. On a portion of the separator which contacts the MEA, a gas passage is formed to supply a reactant gas to the electrode surface and carry away a produced gas and an excess gas. The gas passage may be formed separately from the separator. However, it is common to form a groove on the surface of the separator as the gas passage.

Many of the fuel cells have a laminated structure in which a large number of unit cells configured as above are stacked. At the time of the operation of the fuel cell, the heat generation occurs together with the electric power generation. In the laminated cell, by forming, for example, a cooling water passage for every 1-3 unit cells, it is possible to maintain the temperature of the cell constant, and at the same time, to utilize the generated heat energy in the form of, for example, hot water.

In the case of manufacturing a stack, the polymer electrolyte membrane is sandwiched between electrodes and further sandwiched between separators, and is fastened by end plates and bolts. It is necessary that the polymer electrolyte membrane have adequate strength to endure the fastening pressure and not to be physically damaged by abrasion, etc. in a long-term use. On the other hand, it is necessary to form the polymer electrolyte membrane as thin as possible to, for example, improve the proton conductivity. For these reasons, various studies have been made to increase the strength of the polymer electrolyte without increasing the thickness thereof.

For example, Patent Document 1 proposes the polymer electrolyte fuel cell which intends to prevent the polymer electrolyte membrane from damaging by attaching a frame-shaped protective film to a peripheral portion of the polymer electrolyte membrane (see FIG. 1 of Patent Document 1 for example). Hereinafter, the configuration of this polymer electrolyte fuel cell will be explained with reference to the drawings. FIG. 13 is an essential portion exploded perspective view for explaining a positional relation between a solid polymer electrolyte membrane and fluororesin sheets (protective films) in the polymer electrolyte fuel cell described in Patent Document 1. As shown in FIG. 13, in the polymer electrolyte fuel cell of Patent Document 1, a fluororesin sheet (protective film) 220 and a fluororesin sheet (protective film) 240 are disposed on a front main surface and a rear main surface of a solid polymer electrolyte membrane 1000, respectively, such that these sheets cover the entire peripheral portions of the substantially rectangular main surfaces of the solid polymer electrolyte membrane 1000.

Patent Document 1: Japanese Laid-Open Patent Application Publication 5-21077

DISCLOSURE OF THE INVENTION

Problems to be Solved by the Invention

However, in the polymer electrolyte fuel cell in the above-described conventional technology, especially an assembly of the polymer electrolyte membrane and the protective films does not have a configuration (structure) which can be mass produced easily at low cost. Therefore, there is room for improvement of further cost reduction of the polymer electrolyte fuel cell and further improvement of the productivity (effective mass production) of the polymer electrolyte fuel cell.

The present invention was made in light of these circumstances, and an object of the present invention is to provide a membrane-membrane reinforcing member assembly which can secure adequate durability and has a configuration suitable for the cost reduction of the polymer electrolyte fuel cell and the mass production of the polymer electrolyte fuel cell, and to provide a manufacturing method thereof. Another object of the present invention is to provide a membrane-catalyst layer assembly which includes the membrane-membrane reinforcing member assembly of the present invention and further includes a catalyst layer, and to provide a manufacturing method thereof. Still another object of the present invention is to provide a membrane-electrode assembly which includes the membrane-catalyst layer assembly of the present invention and further includes a gas diffusion layer, and to provide a manufacturing method thereof. Yet another object of the present invention is to provide a polymer electrolyte fuel cell which includes the membrane-electrode assembly of the present invention.

Means for Solving the Problems

Referring to the drawings, the following will more specifically explain the reason why especially the assembly of the polymer electrolyte membrane and the protective film in the polymer electrolyte fuel cell of the above-described conventional technology does not have the configuration which can be mass produced easily at low cost.

FIG. 14 is an explanatory diagram showing one example of a manufacturing method generally used in the case of mass producing the polymer electrolyte fuel cell described in Patent Document 1 using a known thin film laminate manufacturing technology. For example, in the case of mass producing the polymer electrolyte fuel cell described in Patent Document 1, first, as shown in FIG. 14, a tape-shaped solid polymer electrolyte membrane 260 is manufactured and rolled, so that a roll 262 is obtained, and a tape-shaped protective film 250 (tape-shaped membrane formed by continuously forming the protective film 220 shown in FIG. 14) is manufactured and rolled, so that a roll 252 is obtained. Next, using a device including a manufacturing mechanism configured as shown in FIG. 14, a laminate is manufactured, in which the tape-shaped protective film 250 is stacked on at least one of the main surfaces of the tape-shaped solid polymer electrolyte membrane 260. For example, the tape-shaped protective film 250 and the tape-shaped solid polymer electrolyte membrane 260 are pulled out from the roll 252 and the roll 262, respectively, the tape-shaped protective film 250 and tape-shaped solid polymer electrolyte membrane 260 are sandwiched between a pair of rollers 290 to be integrated with each other, and the tape-shaped protective film 250 and tape-shaped solid polymer electrolyte membrane 260 are rolled as a laminate. Thus, a roll 280 is obtained. When the tape-shaped protective film 250 and tape-shaped solid polymer electrolyte membrane 260 are sandwiched between the pair of rollers 290 and are integrated with each other, the tape-shaped protective film 250 and tape-shaped solid polymer electrolyte membrane 260 may be subjected to a heat treatment, a pressure treatment or a pressure-heat treatment. Moreover, before the tape-shaped protective film 250 and tape-shaped solid polymer electrolyte membrane 260 are integrated with each other, adhesive may be applied to the main surface (adhesive surface) of at least one of the tape-shaped protective film 250 and the tape-shaped solid polymer electrolyte membrane 260.

When manufacturing the roll 280, tension is applied to the protective film 250 in a direction (longitudinal direction of the tape-shaped protective film 250) D10 in which the protective film 250 proceeds. The protective film 250 is a very thin film (50 μm or less for example) and has an opening 222 inside the main surface thereof. Therefore, if the tension is applied to the protective film 250, a portion R200 extending in a direction substantially perpendicular to a direction in which the tension to the protective film 250 is applied rises. Therefore, there is a high possibility that when the rollers 290 press the protective film 250, wrinkling is generated at the portion R200 between the rollers 290 and the roll 252. Moreover, there is a high possibility that the portion R200 of the protective film 250 is peeled off by the tension from the solid polymer electrolyte membrane 260 between the rollers 290 and the roll 280.

For the above reasons, in the case of the polymer electrolyte fuel cell having the conventional configuration shown in FIG. 13, a troublesome, complex method for manufacturing the MEA one by one has to be adopted in order to surely manufacture the MEA while preventing product failure. To be specific, a troublesome, complex, high-cost manufacturing method for positioning the protective films 220 and 240 on the solid polymer electrolyte membrane 1000 one by one and attaching them one by one to the solid polymer electrolyte membrane 1000 by a batch method has to be adopted.

To solve the above problems, the present invention provides a membrane-membrane reinforcing member assembly comprising: a polymer electrolyte membrane having a pair of first main surface and second main surface which face each other and each has a substantially rectangular shape; a pair of first membrane reinforcing members which are disposed on portions, respectively, extending along a pair of opposed sides of four sides of the first main surface, each has a main surface smaller than the first main surface, and each has a film shape; and a pair of second membrane reinforcing members which are disposed on portions, respectively, extending along a pair of opposed sides of four sides of the second main surface, each has a main surface smaller than the second main surface, and each has a film shape, wherein the pair of first membrane reinforcing members and the pair of second membrane reinforcing members are disposed so as to extend along four sides as a whole, respectively, of the polymer electrolyte membrane and so as to sandwich four corners of the polymer electrolyte membrane.

As described above, the membrane-membrane reinforcing member assembly of the present invention is configured such that a pair of reinforcing members (first membrane reinforcing members or second membrane reinforcing members) are disposed only at a pair of opposed sides of four sides of the main surface (first main surface or second main surface). Therefore, there is no portion R200 in the protective film 250 of the fuel cell explained above with reference to FIG. 14. Therefore, a known thin film laminate mass production technique of stacking the tape-shaped reinforcing member (first membrane reinforcing member or second membrane reinforcing member) on the tape-shaped polymer electrolyte membrane and manufacturing a roll of a laminate of the polymer electrolyte membrane and the reinforcing member can be easily applied to the membrane-membrane reinforcing member assembly of the present invention. Therefore, in the case of the membrane-membrane reinforcing member assembly of the present invention, it is unnecessary to adopt a troublesome, complex, high-cost manufacturing method for positioning the protective films on the solid polymer electrolyte membrane one by one and attaching them one by one to the solid polymer electrolyte membrane by the above-described batch method, and it is possible to easily mass produce the membrane-membrane reinforcing member assembly of the present invention at low cost. Moreover, as described above, the membrane-membrane reinforcing member assembly of the present invention is configured such that the pair of first membrane reinforcing members and the pair of second membrane reinforcing members are disposed so as to extend along four sides as a whole, respectively, of the polymer electrolyte membrane and so as to sandwich four corners of the polymer electrolyte membrane. With this, the membrane-membrane reinforcing member assembly of the present invention has adequate mechanical strength capable of adequately preventing the polymer electrolyte membrane from being damaged. To be specific, the membrane-membrane reinforcing member assembly of the present invention has adequate durability by the pair of first membrane reinforcing members and the pair of second membrane reinforcing members.

Therefore, the membrane-membrane reinforcing member assembly of the present invention has the configuration suitable for mass production in which the pair of first membrane reinforcing members and the pair of second membrane reinforcing members are disposed with the polymer electrolyte membrane disposed therebetween. Therefore, by configuring the polymer electrolyte fuel cell using the membrane-membrane reinforcing member assembly of the present invention, it is possible to easily realize further cost reduction of the polymer electrolyte fuel cell and further improvement of the productivity of the polymer electrolyte fuel cell while securing adequate durability.

Further, the membrane-membrane reinforcing member assembly of the present invention is configured such that the first membrane reinforcing members (or the second membrane reinforcing members) are disposed only at a pair of opposed sides of four sides of the first main surface (or the second main surface). Therefore, it is possible to reduce the material cost compared to the polymer electrolyte fuel cell described in Patent Document 1 configured such that the protective films 220 and 240 shown in FIG. 14 are disposed on the entire peripheral portion of the main surface.

Moreover, the present invention provides a membrane-catalyst layer assembly comprising: the membrane-membrane reinforcing member assembly described above; a first catalyst layer disposed on at least part of a region of the first main surface of the polymer electrolyte of the membrane-membrane reinforcing member assembly on which region the first membrane reinforcing member is not disposed; and a second catalyst layer disposed on at least part of a region of the second main surface of the polymer electrolyte of the membrane-membrane reinforcing member assembly on which region the second membrane reinforcing member is not disposed.

As above, the membrane-catalyst layer assembly of the present invention is configured to include the membrane-membrane reinforcing member assembly of the present invention. Therefore, by configuring the polymer electrolyte fuel cell using the membrane-catalyst layer assembly of the present invention, it is possible to easily realize further cost reduction of the polymer electrolyte fuel cell and further improvement of the productivity of the polymer electrolyte fuel cell.

Further, the present invention provides a membrane-electrode assembly comprising: the membrane-catalyst layer assembly described above; a first gas diffusion layer disposed so as to cover the first catalyst layer of the membrane-catalyst layer assembly; and a second gas diffusion layer disposed so as to cover the second catalyst layer of the membrane-catalyst layer assembly.

As above, the membrane-electrode assembly of the present invention is configured to include the membrane-membrane reinforcing member assembly of the present invention and the membrane-catalyst layer assembly of the present invention. Therefore, by configuring the polymer electrolyte fuel cell using the membrane-electrode assembly of the present invention, it is possible to easily realize further cost reduction of the polymer electrolyte fuel cell and further improvement of the productivity of the polymer electrolyte fuel cell.

Moreover, the present invention provides a polymer electrolyte fuel cell comprising the membrane-electrode assembly described above.

As above, the polymer electrolyte fuel cell of the present invention is configured to include the membrane-membrane reinforcing member assembly of the present invention, the membrane-catalyst layer assembly of the present invention and the membrane-electrode assembly of the present invention. Therefore, in accordance with the polymer electrolyte fuel cell of the present invention, it is possible to easily realize further cost reduction and further improvement of the productivity.

Moreover, the present invention provides a method for manufacturing a membrane-membrane reinforcing member assembly, comprising the steps of: (A) disposing a pair of first membrane reinforcing members, each having a main surface smaller than a first main surface and having a film shape, on portions, respectively, extending along a pair of opposed sides of four sides of the first main surface of a polymer electrolyte membrane having a pair of the first main surface and a second main surface which face each other and each has a substantially rectangular shape; and (B) disposing a pair of second membrane reinforcing members, each having a main surface smaller than the second main surface and having a film shape, on portions, respectively, extending along a pair of opposed sides of four sides of the second main surface, wherein in the steps A and B, the pair of first membrane reinforcing members and the pair of second membrane reinforcing members are disposed so as to extend along four sides as a whole, respectively, of the polymer membrane and so as to sandwich four corners of the polymer membrane.

Moreover, the present invention provides a method for manufacturing a membrane-catalyst layer assembly, comprising the steps of: manufacturing a membrane-membrane reinforcing member assembly by the above-described method for manufacturing the membrane-membrane reinforcing member assembly; (C) disposing a first catalyst layer on at least part of a region of the first main surface of the polymer electrolyte membrane of the membrane-membrane reinforcing member assembly on which region the first membrane reinforcing member is not disposed; and (D) disposing a second catalyst layer on at least part of a region of the second main surface of the polymer electrolyte membrane of the membrane-membrane reinforcing member assembly on which region the second membrane reinforcing member is not disposed.

Moreover, the present invention provides a method for manufacturing a membrane-electrode assembly, comprising the steps of: manufacturing a membrane-catalyst layer assembly by the above-described method for manufacturing the membrane-catalyst layer assembly; (E) disposing a first gas diffusion layer to cover the first catalyst layer of the membrane-catalyst layer assembly; and (F) disposing a second gas diffusion layer to cover the second catalyst layer of the membrane-catalyst layer assembly.

Moreover, the present invention provides a method for manufacturing a polymer electrolyte fuel cell, comprising the step of manufacturing a membrane-electrode assembly by the above-described method for manufacturing the membrane-electrode assembly.

In accordance with the method for manufacturing the membrane-reinforcing member assembly, the method for manufacturing the membrane-catalyst layer assembly, the method for manufacturing the membrane-electrode assembly and the method for manufacturing the polymer electrolyte fuel cell, it is possible to obtain effects regarding the above-described membrane-reinforcing member assembly, membrane-catalyst layer assembly, membrane-electrode assembly and polymer electrolyte fuel cell.

The above object, other objects, features, and advantages of the present invention will be made clear by the following detailed explanation of preferred embodiments with reference to the attached drawings.

Effects of the Invention

In accordance with the present invention, it is possible to provide a membrane-membrane reinforcing member assembly which can secure adequate durability and has a configuration suitable for the cost reduction of a polymer electrolyte fuel cell and the mass production of the polymer electrolyte fuel cell, and to provide a manufacturing method thereof.

Moreover, in accordance with the present invention, it is possible to provide a membrane-catalyst layer assembly which includes the membrane-membrane reinforcing member assembly of the present invention, further includes a catalyst layer, and is suitable for the cost reduction of the polymer electrolyte fuel cell and the mass production of the polymer electrolyte fuel cell, and to provide a manufacturing method thereof.

Further, in accordance with the present invention, it is possible to provide a membrane-electrode assembly which includes the membrane-catalyst layer assembly of the present invention, further includes a gas diffusion layer, and is suitable for the cost reduction of the polymer electrolyte fuel cell and the mass production of the polymer electrolyte fuel cell, and to provide a manufacturing method thereof.

Furthermore, in accordance with the present invention, it is possible to provide a polymer electrolyte fuel cell which includes the membrane-electrode assembly of the present invention and is suitable for the cost reduction and the mass production, and to provide a manufacturing method thereof.

EXPLANATION OF REFERENCE NUMBERS

1, 1A: membrane-membrane reinforcing member assembly, 2: membrane-catalyst layer assembly, 3: membrane-electrode assembly, 4: fuel cell, 10: polymer electrolyte membrane, 10A: polymer electrolyte-inner reinforcing film complex, 11: first polymer electrolyte membrane, 12: second polymer electrolyte membrane, 22, 24: first membrane reinforcing member, 26, 28: second membrane reinforcing member, 31: first catalyst layer, 32: second catalyst layer, 41: first gas diffusion layer, 42: second gas diffusion layer, 50, 52: separator, 60, 62: gasket, 70, 72, 74, 76: gap, 78: gas passage, 80: inner reinforcing film, 82: opening, 120A, 120B, 122, 134A, 134B: roll, 124, 126: thermocompression bonding device, 128, 130: roller, 130B, 130C: catalyst layer applying device, 132: cutting device, 135A, 135B: base material-membrane reinforcing member laminate, 136A, 136B: membrane reinforcing member, 137A, 137B: base material, 138: membrane reinforcing member cut surface, 140: polymer electrolyte membrane, 141: membrane-membrane reinforcing member laminate, 142A, 142B: membrane reinforcing member, 143: reinforcing member laminate, 144: laminate, 145: band-shaped laminate, 186: mask, 186A: opening, 190: catalyst layer, D1, D2, D3: proceeding direction, F1: first main surface, F2: second main surface, F3: main surface of first catalyst layer, F4: main surface of second catalyst layer, F5: main surface of first gas diffusion layer, F6: main surface of second gas diffusion layer, F1A, F22, F24, F26, F28: main surface, P1: first step, P2: second step, P3: third step, P4: fourth step, P5: fifth step.

BEST MODE FOR CARRYING OUT THE INVENTION

Hereinafter, the best mode for carrying out the present invention will be explained with reference to the drawings. Note that the same reference numbers are used for the same or corresponding members, and a repetition of the same explanation may be avoided.

Embodiment 1

Figure 1:
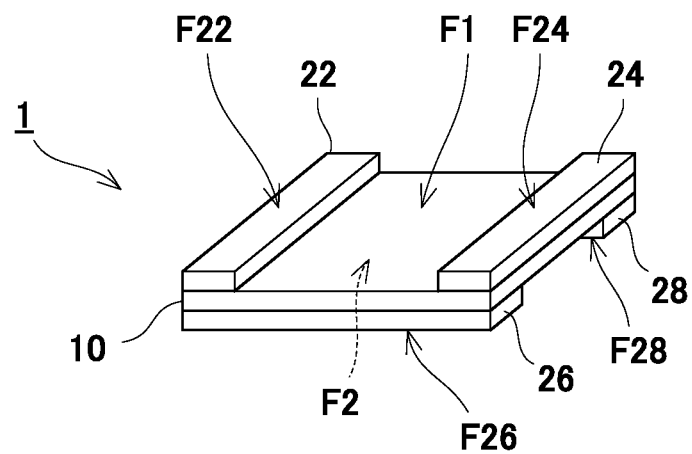
FIG. 1 is a perspective view showing one example of the basic configuration of Embodiment 1 of a membrane-membrane reinforcing member assembly of the present invention.
Figure 2:
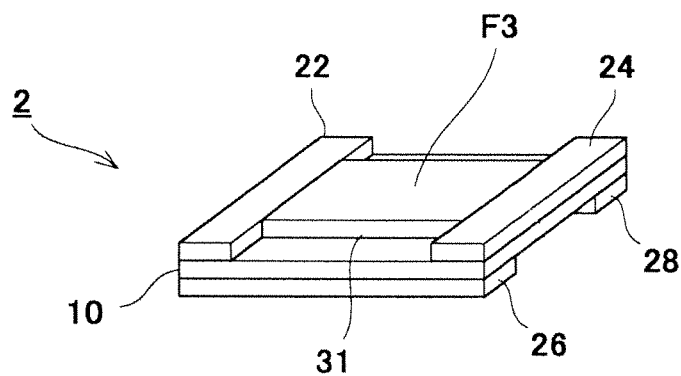
FIG. 2 is a perspective view showing one example of the basic configuration of a membrane-catalyst layer assembly (Embodiment 1 of a membrane-catalyst layer assembly of the present invention) obtained by further disposing a catalyst layer on a membrane-membrane reinforcing member assembly 1 shown in FIG. 1.
Figure 3:
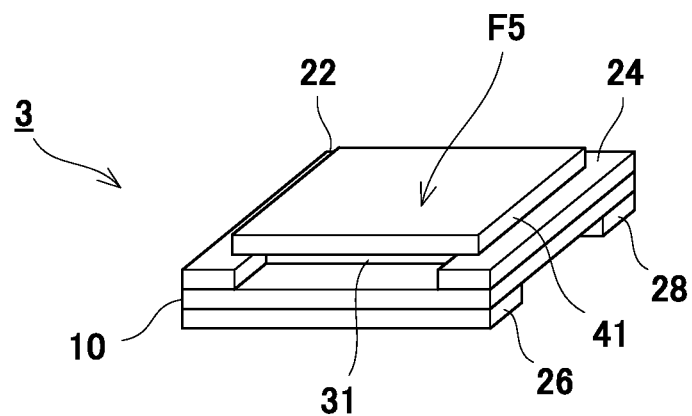
FIG. 3 is a perspective view showing one example of the basic configuration of a membrane-electrode assembly (Embodiment 1 of a membrane-electrode assembly of the present invention) obtained by further disposing a gas diffusion layer on a membrane-catalyst layer assembly 2 shown in FIG. 2.
Figure 4:
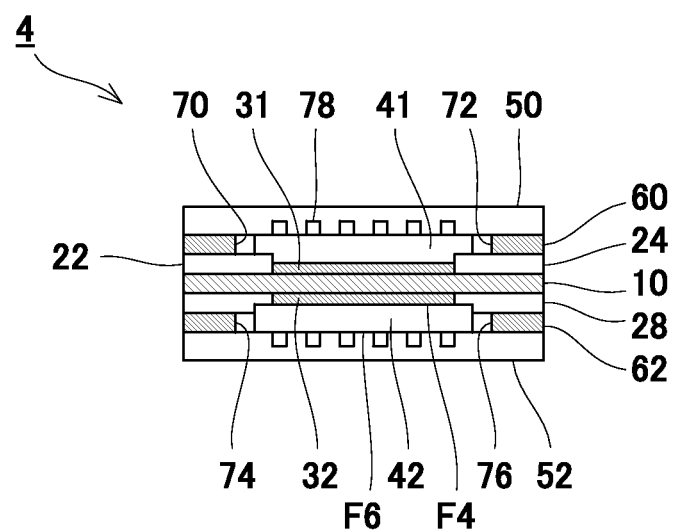
FIG. 4 is a cross-sectional view showing one example (unit cell portion) of the basic configuration of a fuel cell (Embodiment 1 of a polymer electrolyte fuel cell of the present invention) including a membrane-electrode assembly 3 shown in FIG. 3.

FIG. 1 is a perspective view showing one example of the basic configuration of Embodiment 1 of a membrane-membrane reinforcing member assembly of the present invention. FIG. 2 is a perspective view showing one example of the basic configuration of a membrane-catalyst layer assembly (Embodiment 1 of a membrane-catalyst layer assembly of the present invention) obtained by further disposing a catalyst layer on a membrane-membrane reinforcing member assembly 1 shown in FIG. 1. FIG. 3 is a perspective view showing one example of the basic configuration of a membrane-electrode assembly (Embodiment 1 of a membrane-electrode assembly of the present invention) obtained by further disposing a gas diffusion layer on a membrane-catalyst layer assembly 2 shown in FIG. 2. FIG. 4 is a cross-sectional view showing one example (unit cell portion) of the basic configuration of a polymer electrolyte fuel cell (Embodiment 1 of a polymer electrolyte fuel cell of the present invention) including a membrane-electrode assembly 3 shown in FIG. 3.

First, the membrane-membrane reinforcing member assembly 1 of Embodiment 1 shown in FIG. 1 will be explained.

As shown in FIG. 1, the membrane-membrane reinforcing member assembly 1 is configured such that first membrane reinforcing members 22 and 24 and second membrane reinforcing members 26 and 28 are disposed so as to extend along four sides, respectively, of the polymer electrolyte membrane 10 and so as to sandwich four corners of the polymer electrolyte membrane 10 as a whole (this state is hereinafter referred to as "parallel-cross manner").

To be specific, as shown in FIG. 1, the membrane-membrane reinforcing member assembly 1 is configured to mainly include: the polymer electrolyte membrane 10 having a pair of first and second main surfaces F1 and F2 which face each other and each has a substantially rectangular shape; a pair of the first membrane reinforcing members 22 and 24 which are disposed on portions, respectively, extending along a pair of opposed sides of four sides of the first main surface F1, each has a main surface smaller than the first main surface F1, and each has a film shape; and a pair of the second membrane reinforcing members 26 and 28 which are disposed on portions, respectively, extending along a pair of opposed sides of four sides of the second main surface F2, each has a main surface smaller than the second main surface F2, and each has a film shape.

The membrane-membrane reinforcing member assembly 1 of Embodiment 1 is configured such that a pair of reinforcing members (first membrane reinforcing members 22 and 24) are disposed only at a pair of opposed sides, respectively, of four sides of the first main surface F1. Further, the membrane-membrane reinforcing member assembly 1 is configured such that a pair of reinforcing members (second membrane reinforcing members 26 and 28) are disposed only at a pair of opposed sides, respectively, of four sides of the second main surface F2 (among four sides of the second main surface F2, a pair of sides substantially perpendicular to the above pair of sides of the first main surface F1 at which the first membrane reinforcing members 22 and 24 are disposed).

Therefore, there is no portion R200 of the protective film 250 of the fuel cell explained above with reference to FIG. 14. Therefore, it is possible to easily apply to the membrane-membrane reinforcing member assembly 1 a known thin film laminate mass production technique of manufacturing a polymer electrolyte membrane and a reinforcing member laminate 143 by stacking tape-shaped reinforcing members (first membrane reinforcing members 142A and 142B, etc.) on a tape-shaped polymer electrolyte membrane 140, as will be described later with reference to FIGS. 5 to 10

Therefore, in the case of the membrane-membrane reinforcing member assembly 1, it is unnecessary to adopt a troublesome, complex, high-cost manufacturing method for positioning the reinforcing members (the first membrane reinforcing members 22 and 24 or the second membrane reinforcing members 26 and 28) on the solid polymer electrolyte membrane 10 one by one and attaching them one by one to the solid polymer electrolyte membrane 10 by a batch method. Therefore, it is possible to easily mass produce the membrane-membrane reinforcing member assembly 1 at low cost.

As described above, the membrane-membrane reinforcing member assembly 1 is configured such that the first membrane reinforcing members 22 and 24 and the second membrane reinforcing members 26 and 28 are disposed so as to extend along four sides, respectively, of the polymer electrolyte membrane 10 and so as to sandwich four corners of the polymer electrolyte membrane 10 as a whole (in the parallel-cross manner). With this, the membrane-membrane reinforcing member assembly 1 has adequate mechanical strength capable of preventing the polymer electrolyte membrane 10 from being damaged.

As above, the membrane-membrane reinforcing member assembly 1 has such a configuration suitable for the mass production that the first membrane reinforcing members 22 and 24 and the second membrane reinforcing members 26 and 28 are disposed with the polymer electrolyte membrane 10 disposed therebetween. Therefore, by configuring the polymer electrolyte fuel cell using the membrane-membrane reinforcing member assembly 1, it is possible to easily realize the cost reduction of the polymer electrolyte fuel cell and improvement of the productivity of the polymer electrolyte fuel cell while securing adequate durability.

Explained above was the mode in which in the membrane-membrane reinforcing member assembly 1 shown in FIG. 1, outer edges of the first membrane reinforcing members 22 and 24 correspond to an outer edge of the polymer electrolyte membrane 10, and outer edges of the second membrane reinforcing members 26 and 28 correspond to the outer edge of the polymer electrolyte membrane 10. However, positions of the first membrane reinforcing members 22 and 24 and the second membrane reinforcing members 26 and 28 on the polymer electrolyte membrane 10 are not limited to this mode, and the positions may be any positions as long as the first membrane reinforcing members 22 and 24 and the second membrane reinforcing members 26 and 28 extend along four sides, respectively, of the polymer electrolyte membrane 10 as a whole.

For example, the first membrane reinforcing member 22 may be disposed on the polymer electrolyte membrane 10 such that the outer edge of the polymer electrolyte membrane 10 projects outwardly from the outer edge of the first membrane reinforcing member 22. Moreover, for example, the first membrane reinforcing member 22 may be disposed on the polymer electrolyte membrane 10 such that the outer edge of the first membrane reinforcing member 22 projects outwardly from the outer edge of the polymer electrolyte membrane 10. Further, the position of the first membrane reinforcing member 24 on the polymer electrolyte membrane 10, the position of the second membrane reinforcing member 26 on the polymer electrolyte membrane 10, and the position of the second membrane reinforcing member 28 on the polymer electrolyte membrane 10 may be determined in the same manner as the position of the first membrane reinforcing member 22 on the polymer electrolyte membrane 10.

Next, respective members of the membrane-membrane reinforcing member assembly 1 will be explained.

Figure 14:
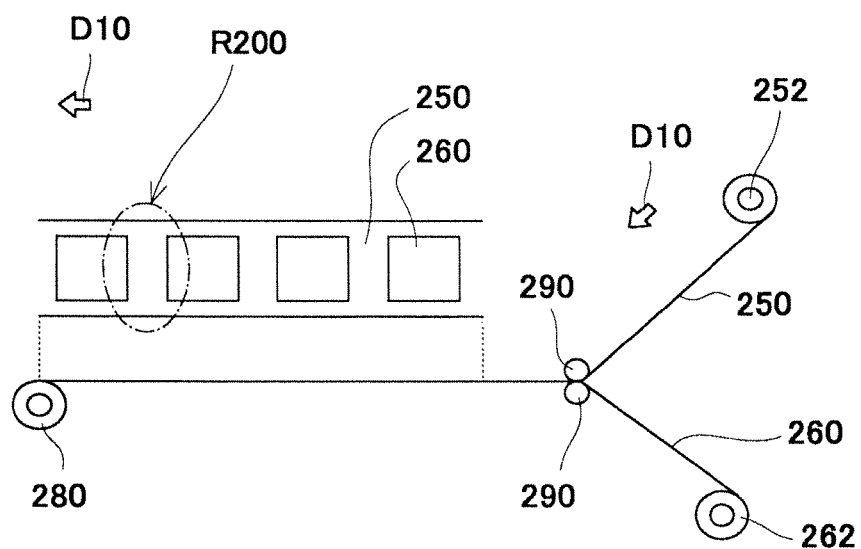
FIG. 14 is an explanatory diagram showing one example of a manufacturing method generally used in the case of mass producing the polymer electrolyte fuel cell described in Patent Document 1 using a known thin film laminate manufacturing technology.

Since the membrane-membrane reinforcing member assembly of the present invention is configured such that the first membrane reinforcing members (or the second membrane reinforcing members) are disposed only at a pair of opposed sides, respectively, of four sides of the first main surface (or the second main surface), the material cost can be reduced as compared to the polymer electrolyte fuel cell described in Patent Document 1 configured such that the protective films 220 and 240 shown in FIG. 14 are disposed on the entire peripheral portion of the main surface.

The polymer electrolyte membrane 10 has proton conductivity. One preferable example of the polymer electrolyte membrane 10 is a membrane containing a sulfonic acid group, a carboxylic acid group, a phosphonic acid group or a sulfonimide group as a positive ion exchange group. In light of the proton conductivity, it is especially preferable that the polymer electrolyte membrane 10 contain the sulfonic acid group.

As resin constituting the polymer electrolyte membrane containing the sulfonic acid group, it is preferable that the ion exchange capacity be 0.5 to 1.5 milliequivalent/gram of dry resin. It is preferable that the ion exchange capacity of the polymer electrolyte membrane be 0.5 milliequivalent/gram of dry resin or more, since the increase of the resistance value of the polymer electrolyte membrane at the time of power generation can be decreased adequately, and it is preferable that the ion exchange capacity be 1.5 milliequivalent/gram of dry resin or less, since the water content of the polymer electrolyte membrane does not increase, the polymer electrolyte membrane hardly swell, and fine holes of the catalyst layer do not clog. In light of the above, it is especially preferable that the ion exchange capacity be 0.8 to 1.2 milliequivalent/gram of dry resin.

It is preferable that the polymer electrolyte be a copolymer containing a polymerization unit based on a perfluorovinyl compound expressed by $CF_2=CF-(OCF_2CFX)m-Op-(CF_2)n-SO_3H$ (m is an integer from 0 to 3, n is an integer from 1 to 12, p is 0 or 1, and X is a fluorine atom or a trifluoromethyl group), and a polymerization unit based on tetrafluoroethylene.

Preferable example of the above fluorovinyl compound are compounds expressed by Formulas (4) to (6) below. In the following formulas, q is an integer from 1 to 8, r is an integer from 1 to 8, and t is an integer from 1 to 3.

$$CF_2=CFO(CF_2)q\text{-}SO_3H \quad (4)$$

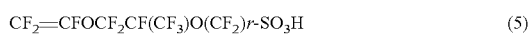

$$CF_2=CFOCF_2CF(CF_3)O(CF_2)r\text{-}SO_3H \quad (5)$$

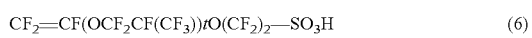

$$CF_2=CF(OCF_2CF(CF_3))tO(CF_2)_2-SO_3H \quad (6)$$

The first membrane reinforcing members 22 and 24 are disposed on portions, respectively, extending along a pair of opposed sides of four sides of the first main surface F1 of the polymer electrolyte membrane 10. Moreover, the first membrane reinforcing members 22 and 24 have substantially rectangular main surfaces F22 and F24, respectively, each of which is smaller than the first main surface F1. Since the first membrane reinforcing members 22 and 24 are disposed on the polymer electrolyte membrane 10, the polymer electrolyte membrane 10 is adequately prevented from being damaged by, for example, the fastening pressure when forming a polymer electrolyte fuel cell 4 (see FIG. 4 described below).

The second membrane reinforcing members 26 and 28 are disposed on portions, respectively, extending along a pair of opposed sides of four sides of the second main surface F2 of the polymer electrolyte membrane 10. Moreover, the second membrane reinforcing members 26 and 28 have substantially rectangular main surfaces F26 and F28, respectively, each of which is smaller than the second main surface F2. Since the second membrane reinforcing members 26 and 28 are disposed on the polymer electrolyte membrane 10, the polymer electrolyte membrane 10 is prevented from being damaged by, for example, the fastening pressure when forming the polymer electrolyte fuel cell 4.

In the membrane-membrane reinforcing member assembly 1 shown in FIG. 1, a pair of the first membrane reinforcing members 22 and 24 and a pair of the second membrane reinforcing members 26 and 28 are disposed in the parallel-cross manner with the polymer electrolyte membrane 10 interposed between the first membrane reinforcing members 22 and 24 and the second membrane reinforcing members 26 and 28. The positional relation between the first membrane reinforcing members 22 and 24 and the second membrane reinforcing members 26 and 28 will be explained more specifically. When the membrane-membrane reinforcing member assembly 1 is viewed from a normal direction of the first main surface, the first membrane reinforcing members 22 and 24 and the second membrane reinforcing members 26 and 28 are disposed such that each of a longitudinal direction (long-side direction) of the main surface F22 of the first membrane reinforcing member 22 and a longitudinal direction (long-side direction) of the main surface F24 of the first membrane reinforcing member 24 is substantially perpendicular to each of a longitudinal direction (long-side direction) of the main surface F26 of the second membrane reinforcing member 26 and a longitudinal direction (long-side direction) of the main surface F28 of the second membrane reinforcing member 28 (with the polymer electrolyte membrane 10 disposed between a pair of the first membrane reinforcing members 22 and 24 and a pair of the second membrane reinforcing members 26 and 28).

Moreover, in light of the durability, it is preferable that the material of the first membrane reinforcing members 22 and 24 or the material of the second membrane reinforcing members 26 and 28 be at least one type of synthetic resin selected from a group consisting of polyethylene naphthalate, polytetrafluoroethylene, polyethylene terephthalate, fluoroethylene-propylene copolymer, tetrafluoroethylene-perfluoro alkoxy ethylene copolymer, polyethylene, polypropylene, polyether amide, polyether imide, polyether ether ketone, polyether sulfone, polyphenylene sulfide, polyarylate, polysulfide, polyimide, and polyimide amide.

Further, the thickness of the first membrane reinforcing member 22, the thickness of the first membrane reinforcing member 24, the thickness of the second membrane reinforcing member 26, and the thickness of the second membrane reinforcing member 28 are not especially limited as long as the effects of the present invention can be obtained. However, in order to surely obtain the effects of the present invention, it is preferable that the thickness of the first membrane reinforcing member 22 and the thickness of the first membrane reinforcing member 24 be equal to each other. From the same viewpoint, it is preferable that the thickness of the second membrane reinforcing member 26 and the thickness of the second membrane reinforcing member 28 be equal to each other.

Next, the membrane-catalyst layer assembly 2 of Embodiment 1 shown in FIG. 2 will be explained.

The membrane-catalyst layer assembly 2 has the same configuration as the membrane-membrane reinforcing member assembly 1 shown in FIG. 1 except that a first catalyst layer 31 is disposed at substantially a center of the first main surface F1, and a second catalyst layer 32 (see FIG. 4) is disposed at substantially a center of the second main surface F2.

In light of ease of manufacturing, it is preferable that the thickness of the first catalyst layer 31 be equal to or less than each of the thickness of the first membrane reinforcing member 22 and the thickness of the first membrane reinforcing member 24, and it is more preferable that it be equal to each of those. From the same viewpoint, it is preferable that the thickness of the second catalyst layer 32 be equal to or less than each of the thickness of the second membrane reinforcing member 26 and the thickness of the second membrane reinforcing member 28, and it is more preferable that it be equal to each of those.

The configuration of the first catalyst layer 31 and the configuration of the second catalyst layer 32 are not especially limited as long as the effects of the present invention can be obtained, and each of the first catalyst layer 31 and the second catalyst layer 32 may have the same configuration as a catalyst layer of a gas diffusion electrode included in a known fuel cell. Moreover, the configuration of the first catalyst layer 31 and the configuration of the second catalyst layer 32 may be the same as each other or may be different from each other.

For example, each of the first catalyst layer 31 and the second catalyst layer 32 may be configured to contain electrically-conductive carbon particles supporting electrode catalyst and a polymer electrolyte having positive ion (hydrogen ion) conductivity, and may be configured to further contain a water-repellent material, such as polytetrafluoroethylene. The polymer electrolyte may be the same as or may be different from the material of the above-described polymer electrolyte membrane 10. As the material of the polymer electrolyte, it is possible to use the material described above as the material of the polymer electrolyte membrane 10.

The electrode catalyst is made of metallic particles (for example, metallic particles made of precious metal), and is used in a state of being supported by electrically-conductive carbon particles (powder). The metallic particle is not especially limited, and various metals can be used. However, in light of the electrode reaction activity, it is preferable that the metallic particle be at least one type selected from a group consisting of platinum, gold, silver, ruthenium, rhodium, palladium, osmium, iridium, chromium, iron, titanium, manganese, cobalt, nickel, molybdenum, tungsten, aluminium, silicon, zinc, and tin. Among these, platinum and an alloy of platinum are preferable, and an alloy of platinum and ruthenium is especially preferable since the activity of the catalyst becomes stable in the anode.

Moreover, it is more preferable that the average diameter of the particles of the electrode catalyst be 1 to 5 nm. The electrode catalyst having the average diameter of 1 nm or more is preferable since it is industrially easy to prepare such electrode catalyst. Moreover, the electrode catalyst having the average diameter of 5 nm or less is preferable since it becomes easy to secure the activity per unit mass of the electrode catalyst more adequately and this leads to the cost reduction of the fuel cell.

It is preferable that the specific surface area of the electrically-conductive carbon particle be 50 to 1500 $m^2/g$. The specific surface area of 50 $m^2/g$ or more is preferable since the supporting rate of the electrode catalyst can be easily increased, and the output characteristics of the obtained first catalyst layer 31 and the output characteristics of the obtained second catalyst layer 32 can be secured more adequately. Moreover, the specific surface area of 1,500 $m^2/g$ or lower is preferable since adequate-size fine holes can be secured more easily, the covering by the polymer electrolyte can be carried out more easily, and the output characteristics of the first catalyst layer 31 and the second catalyst layer 32 can be secured more adequately. From the same viewpoint, it is especially preferable that the specific surface area be 200 to 900 $m^2/g$.

Moreover, it is preferable that the electrically-conductive carbon particle have the average diameter of 0.1 to 1.0 μm. The average diameter of 0.1 μm or more is preferable since it becomes easy to more adequately secure the gas diffusivity in the first catalyst layer 31 and the second catalyst layer 32, and flooding can be prevented more surely. Moreover, the electrically-conductive carbon particle having the average diameter of 1.0 μm or less is preferable since it becomes easy to more easily make the covering state of the electrode catalyst by the polymer electrolyte satisfactory, and it becomes easy to more adequately secure the covering area of the electrode catalyst by the polymer electrolyte, thereby being able to secure adequate electrode performance more easily.

The first catalyst layer 31 and the second catalyst layer 32 can be formed using, for example, a known method for manufacturing the catalyst layer of the gas diffusion electrode of a fuel cell. For example, the first catalyst layer 31 and the second catalyst layer 32 can be formed by preparing and using liquid (catalyst layer forming ink) containing at least the material (for example, electrically-conductive carbon particles supporting electrode catalyst, and polymer electrolyte) of the first catalyst layer 31 and the second catalyst layer 32, and a dispersion medium.

Next, the membrane-electrode assembly 3 of Embodiment 1 shown in FIG. 3 will be explained.

The membrane-electrode assembly 3 has the same configuration as the membrane-catalyst layer assembly 2 shown in FIG. 2 except that a first gas diffusion layer 41 having a substantially rectangular main surface F5 is disposed so as to cover the first catalyst layer 31, and a second gas diffusion layer 42 having a substantially rectangular main surface F6 is disposed so as to cover the second catalyst layer 32.

It is preferable that the area of the main surface F5 of the first gas diffusion layer be equal to or larger than the area of the main surface F3 of the first catalyst layer, and it is more preferable that the area of the main surface F5 of the first gas diffusion layer be larger than the area of the main surface F3 of the first catalyst layer. Further, it is preferable that the area of the main surface F6 of the second gas diffusion layer be equal to or larger than the area of the main surface F4 of the second catalyst layer, and it is more preferable that the area of the main surface F6 of the second gas diffusion layer be larger than the area of the main surface F4 of the second catalyst layer.

Further, in a case where the area of the main surface F5 of the first gas diffusion layer is larger than the area of the main surface F3 of the first catalyst layer, and the area of the main surface F6 of the second gas diffusion layer is larger than the area of the main surface F4 of the second catalyst layer, it is preferable that end portions of the first gas diffusion layer which portions include a pair of opposed sides, respectively, of four sides of the substantially rectangular main surface F5, the pair of opposed sides being located closest to the first membrane reinforcing members 22 and 24, respectively, be disposed on the main surface F22 of the first membrane reinforcing member 22 and the main surface F24 of the first membrane reinforcing member 24, respectively. Moreover, it is preferable that end portions of the second gas diffusion layer which portions include a pair of opposed sides, respectively, of four sides of the substantially rectangular main surface F6, the pair of opposed sides being located closest to the second membrane reinforcing members 26 and 28, respectively, be disposed on the main surface F26 of the second membrane reinforcing member 26 and the main surface F28 of the second membrane reinforcing member 28, respectively. By disposing the first gas diffusion layer 41 and the second gas diffusion layer 42 in the above manner, the end portions of the gas diffusion layer 41 and the end portions of the gas diffusion layer 42 do not directly contact the polymer electrolyte membrane 10 when fastening the membrane-electrode assembly 3, and it is possible to obtain high durability more surely.

The configuration of the first gas diffusion layer 41 and the configuration of the second gas diffusion layer 42 are not especially limited as long as the effects of the present invention can be obtained, and each of the first gas diffusion layer 41 and the second gas diffusion layer 42 may have the same configuration as the gas diffusion layer of the gas diffusion electrode included in a known fuel cell. Moreover, the configuration of the first gas diffusion layer 41 and the configuration of the second gas diffusion layer 42 may be the same as each other or may be different from each other.

For example, in order that the first gas diffusion layer 41 and the second gas diffusion layer 42 have the gas permeability, an electrically-conductive base material having a porous structure, which is manufactured using high surface area carbon fine powder, pore-forming material, carbon paper, carbon cloth, or the like, may be used as the first gas diffusion layer 41 and the second gas diffusion layer 42. Moreover, in order to obtain adequate water discharge property, for example, water-repellent polymer, typically fluorocarbon resin, may be dispersed in the first gas diffusion layer and the second gas diffusion layer 42. Further, in order to obtain adequate electron conductivity, the first gas diffusion layer 41 and the second gas diffusion layer 42 may be formed by an electron conductive material, such as carbon fiber, metal fiber or carbon fine powder.

Moreover, a water-repellent carbon layer constituted of water-repellent polymer and carbon powder may be disposed between the first gas diffusion layer 41 and the first catalyst layer 31 and between the second gas diffusion layer 42 and the second catalyst layer 32. With this, water control in the membrane-electrode assembly (retention of water necessary for maintaining satisfactory properties of the membrane-electrode assembly, and water discharge of unnecessary water) can be carried out more easily and more surely.

Next, the fuel cell 4 of Embodiment 1 shown in FIG. 4 will be explained.

The polymer electrolyte fuel cell 4 is mainly constituted of the membrane-electrode assembly 3 shown in FIG. 3, gaskets 60 and 62, and separators 50 and 52.

The gasket 60 and the gasket 62 are disposed on the periphery of the membrane-electrode assembly 3 to prevent the fuel gas and the oxidizing gas, to be supplied to the membrane-electrode assembly 3, from leaking outside and from being mixed with each other.

A pair of separators 50 and 52 are disposed on outer sides of the membrane-electrode assembly 3, respectively, in order to mechanically fix the membrane-electrode assembly 3. On an inner surface of the separator 50 which surface contacts the first gas diffusion layer 41 (main surface F5 on an outer side of the first gas diffusion layer 41) of the membrane-electrode assembly 3, a gas passage 78 is formed to supply the oxidizing gas or the fuel gas to the membrane-electrode assembly 3 and to carry away an electrode reaction product and a gas containing an unreacted reactant gas from a reaction field to outside the membrane-electrode assembly 3. Moreover, on an inner surface of the separator 52 which surface contacts the second gas diffusion layer 42 (main surface F6 on an outer side of the second gas diffusion layer 42) of the membrane-electrode assembly 3, the gas passage 78 is formed to supply the oxidizing gas or the fuel gas to the membrane-electrode assembly 3 and to carry away the electrode reaction product and a gas containing the unreacted reactant gas from the reaction field to outside the membrane-electrode assembly 3.

The gas passage 78 may be formed separately from the separator 50 and the separator 52. However, the fuel cell 4 of FIG. 4 adopts the configuration including the gas passage 78 formed by a groove on the inner surface (surface contacting the main surface F5 on the outer side of the first gas diffusion layer 41) of the separator 50 and the inner surface (surface contacting the main surface F6 on the outer side of the second gas diffusion layer 42) of the separator 52.

Moreover, the separator 50 may be configured such that a cooling water passage (not shown) formed by a groove formed by, for example, a cutting process is formed on an outer surface thereof opposite the surface contacting the membrane-electrode assembly 3. Also, the separator 52 may be configured such that the cooling water passage (not shown) formed by a groove formed by, for example, the cutting process is formed on an outer surface thereof opposite the surface contacting the membrane-electrode assembly 3.

By fixing the membrane-electrode assembly 3 between a pair of the separators 50 and 52, and for example, supplying the fuel gas to the gas passage 78 of the separator 50 and the oxidizing gas to the gas passage 78 of the separator 52, the single fuel cell 4 can generate an electromotive force of about 0.7 to 0.8V at the time of energization of a practical current density of several tens to several hundreds of $mA/cm^2$. However, since a voltage of several volts to several hundreds of volts is usually required when using the polymer electrolyte fuel cell as a power source, the fuel cell 4 is actually used as so-called stack (not shown) obtained by connecting a required number of the fuel cells 4 in series. For example, the fuel cell 4 is used as a stack obtained by disposing a laminate, obtained by stacking a plurality of the fuel cells 4, between two opposed end plates, and fastening these members.

Next, one example of each of a method for manufacturing the membrane-membrane reinforcing member assembly 1 shown in FIG. 1, a method for manufacturing the membrane-catalyst layer assembly 2 shown in FIG. 2 and a method for manufacturing the membrane-electrode assembly 3 shown in FIG. 3 (a preferred embodiment of a method for manufacturing the membrane-membrane reinforcing member assembly of the present invention, a preferred embodiment of a method for manufacturing the membrane-catalyst layer assembly of the present invention and a preferred embodiment of a method for manufacturing the membrane-electrode assembly of the present invention) will be explained with reference to the drawings.

Figure 5:
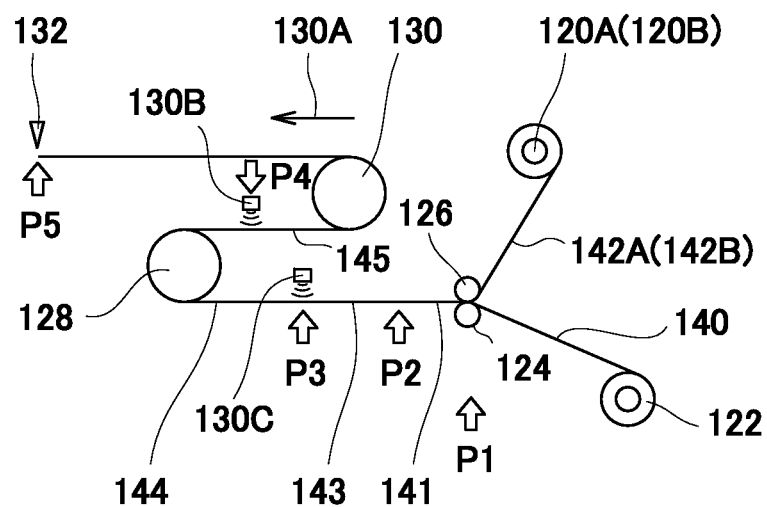
FIG. 5 is an explanatory diagram schematically showing part of a series of steps of manufacturing the membrane-membrane reinforcing member assembly 1 shown in FIG. 1, the membrane-catalyst layer assembly 2 shown in FIG. 2, and the membrane-electrode assembly 3 shown in FIG. 3.

FIG. 5 is an explanatory diagram schematically showing part of a series of steps of manufacturing the membrane-membrane reinforcing member assembly 1 shown in FIG. 1, the membrane-catalyst layer assembly 2 shown in FIG. 2, and the membrane-electrode assembly 3 shown in FIG. 3.

The membrane-membrane reinforcing member assembly 1 shown in FIG. 1, the membrane-catalyst layer assembly 2 shown in FIG. 2 and the membrane-electrode assembly 3 shown in FIG. 3 can be easily mass produced at low cost through a series of steps shown in FIG. 5 that are a first step P1, a second step P2, a third step P3, a fourth step P4 and a fifth step P5.

First, a polymer electrolyte roll 122 obtained by rolling the tape-shaped polymer electrolyte membrane 140 (that is a member which becomes the polymer electrolyte membrane 10 shown in FIG. 1 by cutting), a membrane reinforcing member roll 120A obtained by rolling the tape-shaped membrane reinforcing member 142A (that is a member which becomes the first membrane reinforcing member 22 shown in FIG. 1 by cutting), and a membrane reinforcing member roll 120B obtained by rolling the tape-shaped membrane reinforcing member 142B (that is a member which becomes the first membrane reinforcing member 24 shown in FIG. 1 by cutting) are manufactured using a known thin film manufacturing technique.

Figure 6:
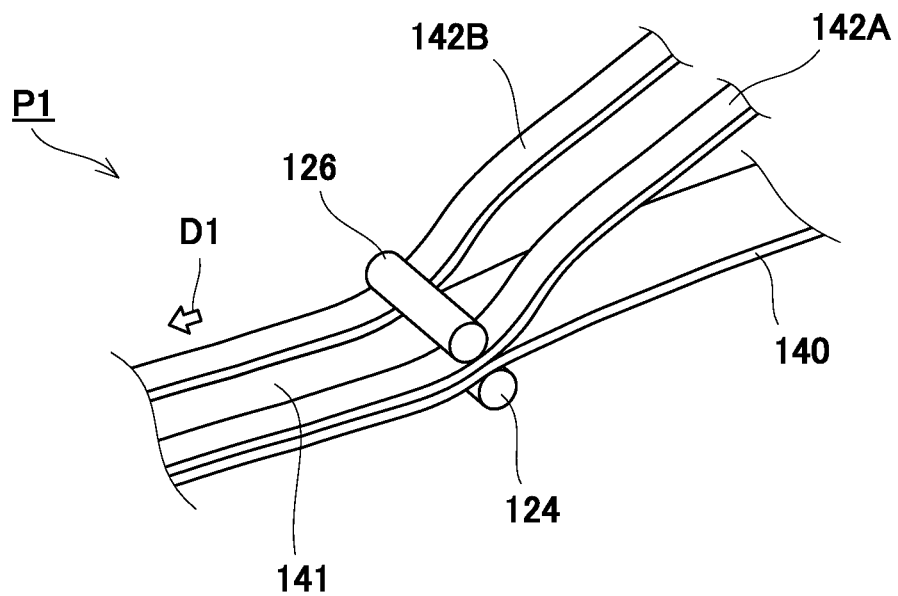
FIG. 6 is an explanatory diagram for explaining the operation of a first step P1 in FIG. 5.

Next, the membrane reinforcing members 142A and 142B are joined to side end portions of the polymer electrolyte membrane 140, respectively (first step P1). The first step P1 will be explained with reference to the drawings. FIG. 6 is an explanatory diagram for explaining the operation of the first step P1 in FIG. 5.

As shown in FIGS. 5 and 6, the membrane reinforcing member 142A is pulled out from the roll 120A, the membrane reinforcing member 142B is pulled out from the roll 120B, and the polymer electrolyte membrane 140 is pulled out from the roll 122, and these are introduced into a thermocompression bonding device (not shown) including a pair of rollers 124 and 126 such that the membrane reinforcing member 142A and the membrane reinforcing member 142E are mounted on the side end portions of the polymer electrolyte membrane 140, respectively. As shown in FIG. 6, in a process in which the polymer electrolyte membrane 140, the membrane reinforcing member 142A and the membrane reinforcing member 142B proceed between the roller 124 and the roller 126 in a proceeding direction D1 within the thermocompression bonding device, the polymer electrolyte membrane 140, the membrane reinforcing member 142A and the membrane reinforcing member 142E are joined to each other in a state in which the membrane reinforcing member 142A and the membrane reinforcing member 142B are placed on the side end portions of the polymer electrolyte membrane 140, respectively. Thus, a tape-shaped membrane-membrane reinforcing member laminate 141 is obtained. The width between the roll 120A and the roll 120B is adjusted to correspond to the size of the first catalyst layer 31.

In the first step P1, since there is no portion R200 (portion which tends to rise by the tension and extends in a direction substantially perpendicular to a direction in which the tension is applied) of the protective film 250 of the fuel cell explained above with reference to FIG. 14, it is possible to adequately suppress displacement of the membrane reinforcing members 142A and 142B with respect to the polymer electrolyte membrane 140 and peel-off of the membrane reinforcing members 142A and 142B from the polymer electrolyte membrane 140 in the process in which the polymer electrolyte membrane 140 and the membrane reinforcing members 142A and 142B proceed between the roller 124 and the roller 126 in the proceeding direction D1 within the thermocompression bonding device.

Figure 7:
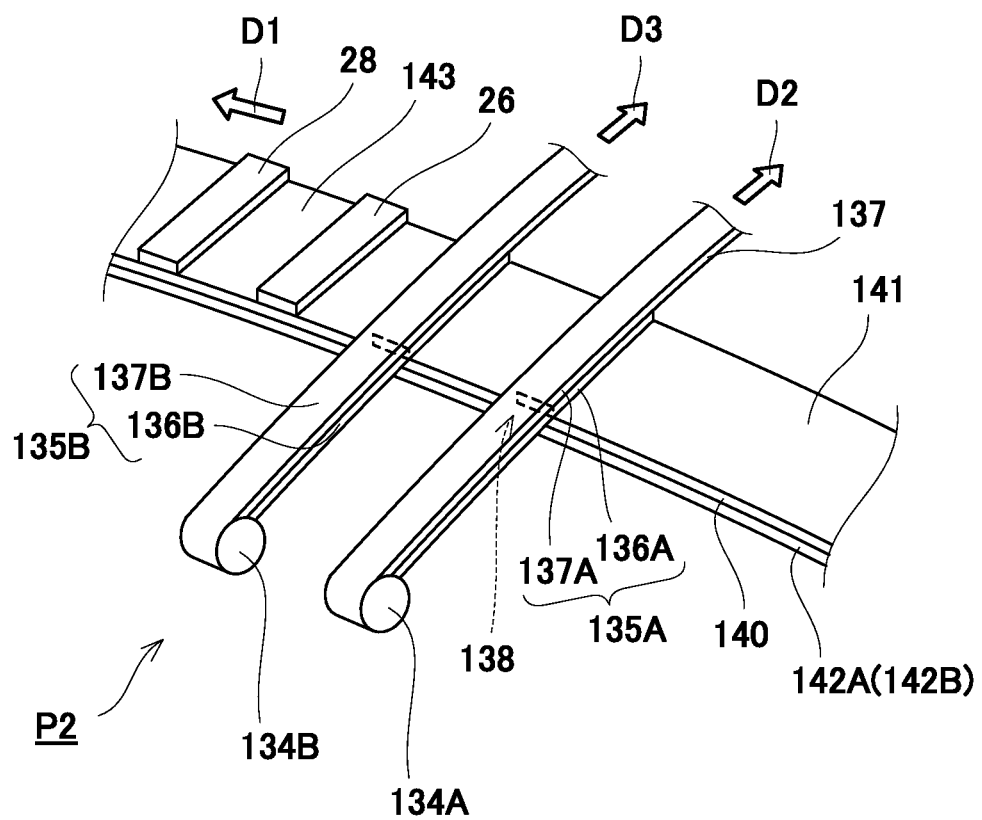
FIG. 7 is an explanatory diagram for explaining the operation of a second step P2 in FIG. 5.

Next, a membrane reinforcing member 136A (that is a member which becomes the second membrane reinforcing member 26 shown in FIG. 1 by cutting) and a membrane reinforcing member 136B (that is a member which becomes the second membrane reinforcing member 28 shown in FIG. 1 by cutting) are joined to a rear surface of the membrane-membrane reinforcing member laminate 141 (second step P2). The second step P2 will be explained with reference to the drawings. FIG. 7 is an explanatory diagram for explaining the operation of the second step P2 in FIG. 5.

As shown in FIGS. 5 and 7, the membrane-membrane reinforcing member laminate 141 obtained in the first step P1 is driven by rollers 128 and 130 to proceed in the proceeding direction D1 up to an area of the second step P2, and then stops there. As shown in FIG. 7, in the area where the second step P2 is carried out, rolls 134A and 134B are disposed on the rear surface of the membrane-membrane reinforcing member laminate 141. The roll 134A is obtained by rolling a base material-reinforcing member laminate 135A formed by stacking the tape-shaped membrane reinforcing member 136A on a tape-shaped base material 137A, and the roll 134B is obtained by rolling a base material-reinforcing member laminate 135B formed by stacking the tape-shaped membrane reinforcing member 136B on a tape-shaped base material 137B.

More specifically, the roll 134A is disposed such that a proceeding direction D2 of the base material-membrane reinforcing member laminate 135A pulled out from the roll 134A and the proceeding direction D1 of the membrane-membrane reinforcing member laminate 141 are substantially perpendicular to each other, and the tape-shaped membrane reinforcing member 136A contacts the rear surface (surface on which the membrane reinforcing members 142A and 142B are not disposed) of the polymer electrolyte membrane 140 of the membrane-membrane reinforcing member laminate 141. Further, the roll 134B is disposed such that a proceeding direction D3 of the base material-membrane reinforcing member laminate 135B pulled out from the roll 134B and the proceeding direction D1 of the membrane-membrane reinforcing member laminate 141 are substantially perpendicular to each other, and the tape-shaped membrane reinforcing member 136B contacts the rear surface (surface on which the membrane reinforcing members 142A and 142B are not disposed) of the polymer electrolyte membrane 140 of the membrane-membrane reinforcing member laminate 141.

In this area, simultaneously with the stopping of the membrane-membrane reinforcing member laminate 141, the base material membrane-membrane reinforcing member laminate 135A pulled out from the roll 134A and the base material membrane-membrane reinforcing member laminate 135B pulled out from the roll 134B stop such that the membrane reinforcing members 136A and 136B contact the rear surface of the polymer electrolyte membrane 140. Next, the base material membrane-membrane reinforcing member laminates 135A and 135B and the membrane-membrane reinforcing member laminate 141 are fixed by pressing means (not shown) so that the displacement does not occur at a contact portion of the polymer electrolyte membrane 140 and the membrane reinforcing member 136A and a contact portion of the polymer electrolyte membrane 140 and the membrane reinforcing member 136B.

Next, the membrane reinforcing member 136A of the base material-membrane reinforcing member laminate 135A and the membrane reinforcing member 136B of the base material membrane-membrane reinforcing member laminate 135B are cut by two cutters (not shown) such that each of the membrane reinforcing member 136A and the membrane reinforcing member 136B correspond to the width of the membrane-membrane reinforcing member laminate 141 (such that a portion of the membrane reinforcing member 136A which contacts the polymer electrolyte membrane 140 and a portion of the membrane reinforcing member 136B which contacts the polymer electrolyte membrane 140 remain). The cut depth of these two cutters is adjusted such that the base material 137A of the base material membrane-membrane reinforcing member laminate 135A and the base material 137B of the base material membrane-membrane reinforcing member laminate 135B are not cut off. In addition, the base materials 137A and 137B have an adequate mechanical strength (hardness, flexibility) so as not to be cut off by these two cutters. Thus, the reinforcing member laminate 143 is obtained, in which the second membrane reinforcing members 26 and 28 are joined to the rear surface of the membrane-membrane reinforcing member laminate 141. The distance between the rolls 134A and 134B is adjusted to correspond to the size of the second catalyst layer 32. Note that one cutter may be used instead of two cutters.

Further, a treatment of causing the membrane reinforcing members 136A and 136B to be adequately integrated with the polymer electrolyte membrane 140 is carried out in the second step P2. For example, when cutting the membrane reinforcing members 136A and 136B by the two cutters, a treatment of fusion-bonding the membrane reinforcing members 136A and 136B to the polymer electrolyte membrane 140 by a heat treatment may be carried out by the pressing means. Moreover, for example, a pretreatment of applying adhesive to the surfaces (contact surfaces) of the membrane reinforcing members 136A and 136B may be carried out before the membrane reinforcing members 136A and 136B contact the polymer electrolyte membrane 140. In the case of carrying out this pretreatment, the above-described fusion-bonding treatment may be carried out, or only the pressure application treatment by the pressing means may be carried out without carrying out the fusion-bonding treatment. Further, it is preferable that the adhesive do not deteriorate the battery characteristics. For example, it may be possible to use a dispersion medium or a solvent containing a polymer electrolyte material (shown above as the material of the polymer electrolyte membrane 10 for example) that is the same type as or the different type (having an affinity so as to be able to be adequately integrated with the polymer electrolyte membrane 140) from the polymer electrolyte membrane 140.

In the second step P2, there is no portion R200 (portion which tends to rise by the tension and extends in a direction substantially perpendicular to a direction in which the tension is applied) of the protective film 250 of the fuel cell explained above with reference to FIG. 14. More specifically, in the second step P2, although each of the second membrane reinforcing members 26 and 28 joined to the rear surface of the membrane-membrane reinforcing member laminate 141 is a portion extending in a direction substantially perpendicular to a direction in which the tension is applied, the adjacent second membrane reinforcing members 26 and 28 are not directly connected to each other unlike the portion R200, so that the adjacent second membrane reinforcing members 26 and 28 are less likely to rise under the tension. Therefore, also in the second step P2, it is possible to adequately suppress the displacement of the second membrane reinforcing members 26 and 28 with respect to the polymer electrolyte membrane 140 and the peel-off of the second membrane reinforcing members 26 and 28 from the polymer electrolyte membrane 140 in the process in which the second membrane reinforcing members 26 and 28 and the polymer electrolyte membrane 140 proceed in the proceeding direction D1. The portion R200 shown in FIG. 14 tends to rise since the adjacent portions R200 are directly connected to each other as part of the protective film 250.

Figure 8:
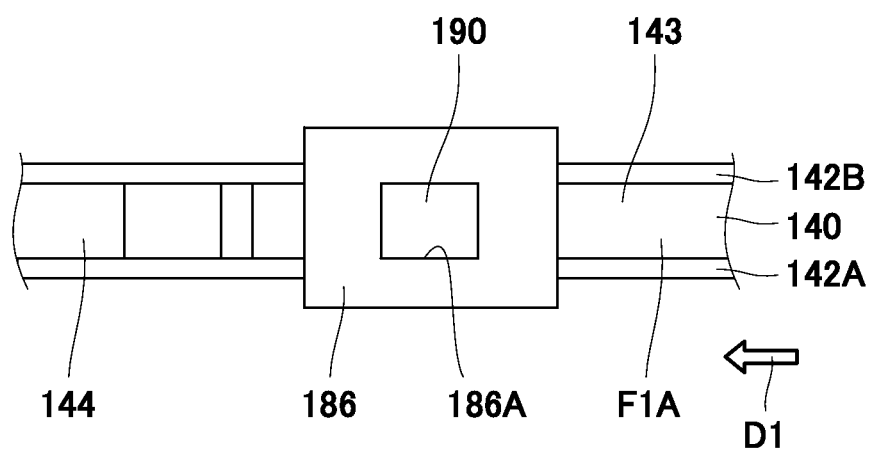
FIG. 8 is an explanatory diagram for explaining the operation of a third step P3 in FIG. 5.

Next, after forming the reinforcing member laminate 143, a catalyst layer 190 (which becomes the first catalyst layer 31 shown in FIG. 2 by cutting) is formed on a main surface F1A (that is a surface which becomes the first main surface F1 shown in FIG. 1 by cutting) of the polymer electrolyte membrane 140 of the reinforcing member laminate 143 on which surface the membrane reinforcing members 142A and 142B are formed (third step P3). The third step P3 will be explained with reference to the drawings. FIG. 8 is an explanatory diagram for explaining the operation of the third step P3 in FIG. 5.

As shown in FIGS. 5 and 8, the reinforcing member laminate 143 obtained in the second step P2 is driven by the rollers 128 and 130 to proceed in the proceeding direction D1 up to an area of the third step P3, and then stops there. As shown in FIG. 8, in the area where the third step P3 is carried out, there are provided a supporting means (supporting base for example), not shown, for supporting the reinforcing member laminate 143 stopped in this area from a rear surface thereof (surface opposite the main surface F1A of the polymer electrolyte membrane 140) and a mask 186 for forming the catalyst layer 190 between the membrane reinforcing member 142A and the membrane reinforcing member 142B on the main surface F1A of the polymer electrolyte membrane 140.

The mask 186 has an opening 186A. The shape and area of the opening 186A is set so as to correspond to the shape and area of the catalyst layer 190. Further, a catalyst layer forming device 130C is disposed above the area of the third step. The catalyst layer forming device 130C has such a mechanism that the catalyst layer 190 is formed by, for example, application or spraying of the catalyst layer forming ink on a portion of the main surface F1A of the polymer electrolyte membrane 140 which portion corresponds to the opening 186A of the mask 186. As this mechanism, a known mechanism adopted for forming the catalyst layer of the gas diffusion layer of a fuel cell may be adopted. For example, it is possible to adopt a mechanism designed based on a spraying method, a spin coating method, a doctor blade method, a die coating method, or a screen printing.

Next, one example of the flow of the operation of the third step P3 will be explained in detail. First, the reinforcing member laminate 143 stopped in the area of the third step P3 is fixed so as to be sandwiched by the mask 186 and the supporting base (not shown) therebetween. Next, the catalyst layer forming device 130C operates, and forms the catalyst layer 190 on the portion of the main surface F1A of the polymer electrolyte membrane 140 which portion corresponds to the opening 186A of the mask 186, by, for example, applying or spraying the catalyst layer forming ink from above the opening 186A of the mask 186. Thus, a laminate 144 including the catalyst layer 190 is obtained. Next, after forming the catalyst layer 190, the mask 186 and the supporting base (not shown) are separated from the laminate 144. Next, the laminate 144 is driven by the rollers 128 and 130 to move along the proceeding direction D1.

Next, after forming the laminate 144, a catalyst layer (which becomes the second catalyst layer 32 shown in FIG. 4 by cutting, and is hereinafter referred to as "second catalyst layer 32" for ease of explanation) is formed on a main surface (which becomes the second main surface F2 shown in FIG. 1 by cutting, and is not shown) of the polymer electrolyte membrane 140 of the laminate 144 on which main surface the catalyst layer 190 is not formed (fourth step P42). The fourth step P4 will be explained with reference to FIG. 5.

As shown in FIG. 5, the laminate 144 obtained in the third step P3 is driven by the rollers 128 and 130 to proceed in the proceeding direction D1 (arrow 130A in FIG. 5) up to the area of the fourth step P4, and then stops there. As shown in FIG. 5, the laminate 144 turns around the roller 128 and is inverted such that a main surface F1B (not shown) of the polymer electrolyte membrane 140 on which surface the catalyst layer 190 is not formed faces upward, and the main surface F1A of the polymer electrolyte membrane 140 on which surface the catalyst layer 190 is formed faces downward.

In the area where the fourth step P4 is carried out, there are provided a supporting means (supporting base for example), not shown, for supporting the laminate 144 stopped in the area from a rear surface thereof (main surface F1A of the polymer electrolyte membrane 140), and a mask (not shown) for forming the second catalyst layer 32 between the second membrane reinforcing member 26 and the second membrane reinforcing member 28 on the main surface F1B of the polymer electrolyte membrane 140.

The mask has an opening (not shown) similar to the opening 186A of the mask 186 described above. The shape and area of the opening are designed so as to correspond to the shape and area of the second catalyst layer 32. Further, as shown in FIG. 5, a catalyst layer forming device 130B having the same mechanism as the catalyst layer forming device 130C described above is disposed above the area of the fourth step.

Next, the flow of the operation of the fourth step P4 is also the same as that of the third step P3. By the fourth step P4, a band-shaped laminate 145 formed by further forming the second catalyst layer 32 on the laminate 144 is obtained. Next, by the driving of the rollers 128 and 130, the band-shaped laminate 145 moves along the proceeding direction D1.

Next, as shown in FIG. 5, the band-shaped laminate 145 is introduced into a cutting apparatus having a cutting device 132, and is cut so as to have a predetermined size. Thus, the membrane-catalyst layer assembly 2 shown in FIG. 2 is obtained (fifth step P5).

The component composition, the degree of dryness, etc. of the catalyst layer 190 and the second catalyst layer 32 are adjusted so that the catalyst layer 190 and the second catalyst layer 32 have moderate flexibility. Moreover, the catalyst layer 190 and the second catalyst layer 32 are processed so as not to fall off from the polymer electrolyte membrane 140 when turning around the roller 128 and the roller 130. Moreover, each time the catalyst layer 190 and the second catalyst layer 32 are formed on the polymer electrolyte membrane 140, a drying treatment (for example, at least one of the heat treatment, an air blowing treatment and a degassing treatment) may be appropriately carried out.

Next, the first gas diffusion layer 41 and the second gas diffusion layer 42 are joined to the membrane-catalyst layer assembly 2. Thus, the membrane-electrode assembly 3 shown in FIG. 3 is obtained. More specifically, the first gas diffusion layer 41 and the second gas diffusion layer 42 each having a moderate size corresponding to the size of the membrane-catalyst layer assembly 2 obtained after cutting the band-shaped laminate 145 may be prepared, and the first gas diffusion layer 41 and the second gas diffusion layer 42 may be joined to the membrane-catalyst layer assembly 2.

Moreover, the membrane-electrode assembly 3 may be continuously formed in such a manner that a gas diffusion layer roll (not shown) is prepared by rolling a tape-shaped gas diffusion layer (carbon cloth for example), the tape-shaped gas diffusion layer pulled out from the gas diffusion layer roll is integrated with the band-shaped laminate 145, obtained after the fourth step P4, using a device having the same attaching mechanism as in the first step shown in FIG. 6, and then the same cutting process as in the fifth step P5 is carried out. In this case, in the case of further forming the water-repellent carbon layer, a water-repellent carbon layer forming device (not shown) having the same mechanism as the catalyst layer forming device 130C used in the third step P3 except that a water-repellent carbon layer forming ink is used may be used. In this case, the water-repellent carbon layer forming device may be located at such a position that the water-repellent carbon layer forming ink is applied to or sprayed on the band-shaped laminate 145 or the tape-shaped gas diffusion layer which is not yet attached. Moreover, in the case of forming the water-repellent carbon layer, it is possible to use a roll of a tape-shaped gas diffusion layer on a predetermined position of which the water-repellent carbon layer is continuously preformed.

A manufacturing process may be designed such that the operation of the second step P2 described above is carried out after the operation of the third step P3. Moreover, after the operation of the second step P2, the operation of the third step P3 may be continuously carried out in the area of the second step P2.

Next, another example of each of the method for manufacturing the membrane-membrane reinforcing member assembly 1 shown in FIG. 1, the method for manufacturing the membrane-catalyst layer assembly 2 shown in FIG. 2 and the method for manufacturing the membrane-electrode assembly 3 shown in FIG. 3 will be explained with reference to the drawings.

Figure 9:
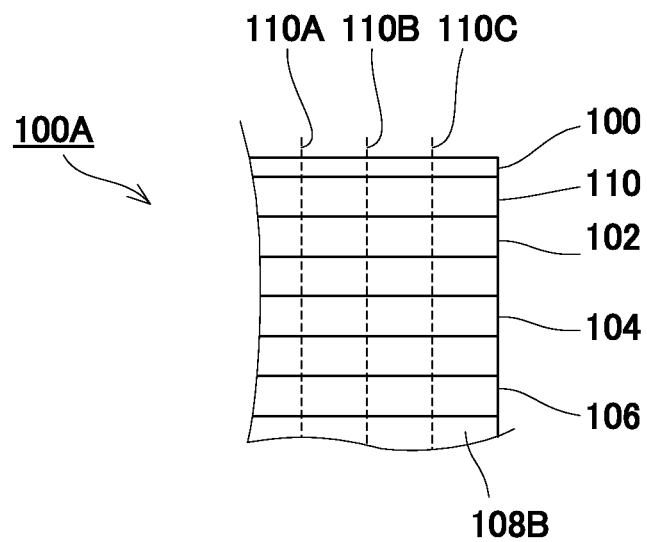
FIG. 9 is an explanatory diagram for explaining a method for manufacturing a membrane-membrane reinforcing member laminate that is a member constituting the membrane-membrane reinforcing member assembly 1.
Figure 10:
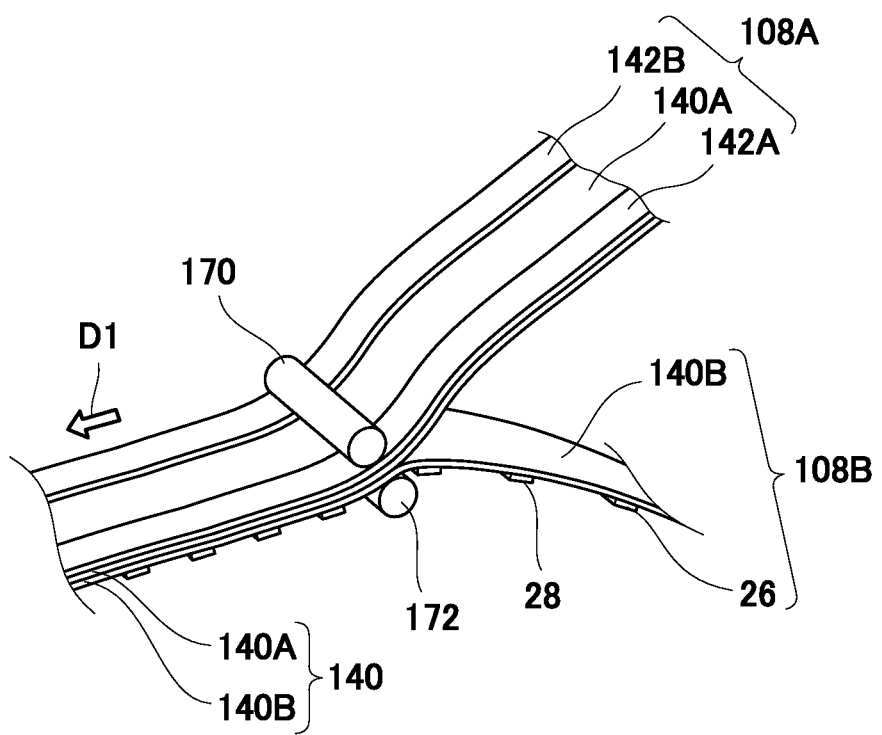
FIG. 10 is an explanatory diagram for explaining the operation of joining the membrane-membrane reinforcing member laminates.

FIG. 9 is an explanatory diagram for explaining a method for manufacturing a membrane-membrane reinforcing member laminate that is a member constituting the membrane-membrane reinforcing member assembly 1. FIG. 10 is an explanatory diagram for explaining the operation of joining two membrane-membrane reinforcing member laminates.

First, as shown in FIG. 9, a membrane-membrane reinforcing member laminate 100A is formed such that three or more tape-shaped membrane reinforcing members (members which become the second membrane reinforcing members 26 and 28 shown in FIG. 1 by cutting) 100, 102, 104, 106, etc. are disposed on one main surface of a polymer electrolyte membrane 110 at constant intervals so as to be substantially in parallel with each other. The membrane-membrane reinforcing member laminate 100A can be formed by, for example, the same method as in the first step explained above using FIG. 6. The interval between two adjacent members of three or more tape-shaped membrane reinforcing members 100, 102, 104, 106, etc. is adjusted so as to correspond to the size of the catalyst layer (second catalyst layer 32) formed later.

Next, the membrane-membrane reinforcing member laminate 100A is cut in a direction substantially perpendicular to the longitudinal direction of the tape-shaped membrane reinforcing member 100 (for example, in FIG. 9, cutting lines in this direction are shown as dotted lines 110A, 110B and 110C). Thus, a plurality of tape-shaped membrane-membrane reinforcing member laminates 108B are obtained. As shown in FIG. 9, a plurality of membrane reinforcing members (members which become the second membrane reinforcing members 26 and 28 shown in FIG. 1 by cutting) on the tape-shaped membrane-membrane reinforcing member laminate 108B are disposed such that the longitudinal direction of each membrane reinforcing member is substantially perpendicular to the longitudinal direction of the tape-shaped membrane-membrane reinforcing member laminate 108B. Next, the tape-shaped membrane-membrane reinforcing member laminate 108B thus obtained is rolled so as to be a roll (not shown).

Meanwhile, manufactured by the same method as in the first step shown in FIG. 6 is a membrane-membrane reinforcing member laminate 108A (see FIG. 10) in which the membrane reinforcing members 142A and 142B are mounted on and joined to the side end portions, respectively, of the tape-shaped the polymer electrolyte membrane 140A. The obtained membrane-membrane reinforcing member laminate 108A is rolled so as to be a roll (not shown). The width (width in a lateral direction) of the membrane-membrane reinforcing member laminate 108A and the width (width in a lateral direction) of the membrane-membrane reinforcing member laminate 108E are adjusted so as to be equal to each other.

Next, as shown in FIG. 10, the membrane-membrane reinforcing member laminates 108A and 108B are joined to each other. More specifically, the membrane-membrane reinforcing member laminates 108A and 108B are pulled out from respective rolls, and are introduced in an overlapping manner into the thermocompression bonding device (not shown) having a pair of rollers 170 and 172. In this case, the rear surface (surface on which the membrane reinforcing member is not disposed) of the polymer electrolyte membrane 140A of the membrane-membrane reinforcing member laminate 108A and the rear surface (surface on which the membrane reinforcing member is not disposed) of the polymer electrolyte membrane 140B of the membrane-membrane reinforcing member laminate 108B are joined to each other. Further in this case, the membrane-membrane reinforcing member laminates 108A and 108B overlap each other such that part of the membrane-membrane reinforcing member laminate 108B do not project from the membrane-membrane reinforcing member laminate 108A when viewed the membrane-membrane reinforcing member laminates 108A and 108B from the normal direction of the main surface of the membrane-membrane reinforcing member laminate 108A.

As shown in FIG. 10, the membrane-membrane reinforcing member laminates 108A and 108 are joined to each other in a process in which the laminates 108A and 108 proceed between the rollers 170 and 172 in the proceeding direction D1 within the thermocompression bonding device. Thus, the tape-shaped membrane-membrane reinforcing member laminate 141 is obtained.

After manufacturing the tape-shaped membrane-membrane reinforcing member laminate 141, the membrane-catalyst layer assembly 2 shown in FIG. 2 and the membrane-electrode assembly 3 shown in FIG. 3 can be manufactured by, for example, a method same as the above-described method.

Further, a method for manufacturing the polymer electrolyte the fuel cell 4 shown in FIG. 4 using the membrane-electrode assembly 3 is not especially limited, and a known polymer electrolyte fuel cell manufacturing technique may be adopted.

Embodiment 2

Figure 11:
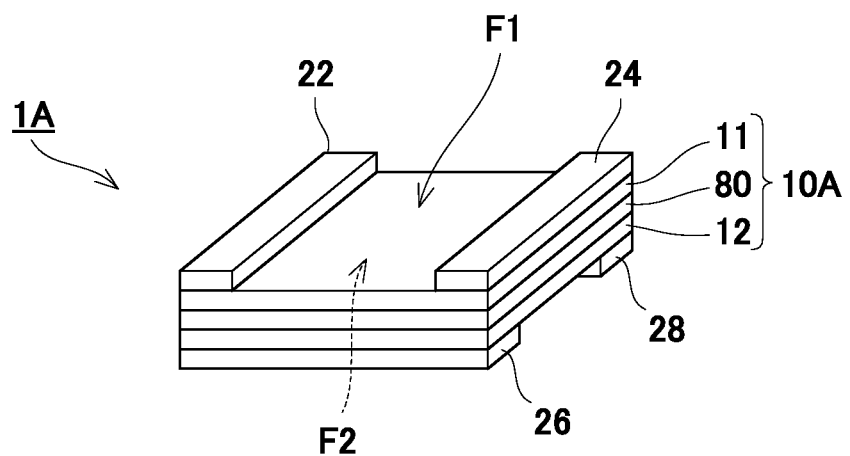
FIG. 11 is a perspective view showing one example of the basic configuration of Embodiment 2 of the membrane-membrane reinforcing member assembly of the present invention.

Next, Embodiment 2 of the membrane-membrane reinforcing member assembly of the present invention will be explained with reference to the drawings. FIG. 11 is a perspective view showing one example of the basic configuration of Embodiment 2 of the membrane-membrane reinforcing member assembly of the present invention.

A membrane-membrane reinforcing member assembly 1A of Embodiment 2 shown in FIG. 11 has the same configuration as the membrane-membrane reinforcing member assembly 1 of FIG. 1 of Embodiment 1 except that a polymer electrolyte-inner reinforcing film complex 10A described later is included therein.

Figure 12:
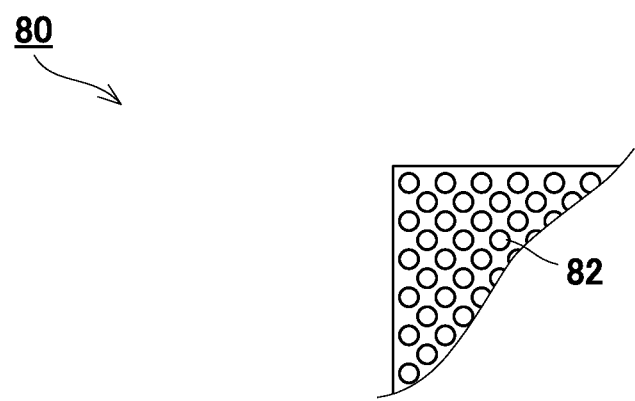
FIG. 12 is an essential portion enlarged front view showing one example of the basic configuration of an inner reinforcing film 80 included in a membrane-membrane reinforcing member assembly 1A shown in FIG. 11.

Next, the polymer electrolyte-inner reinforcing film complex 10A will be explained. As shown in FIG. 11, a polymer electrolyte membrane-inner reinforcing film complex 10A is a membrane having a three-layer structure in which an inner reinforcing film 80 is disposed between a first polymer electrolyte membrane 11 and a second polymer electrolyte membrane 12 which are disposed so as to face each other. Each of the first polymer electrolyte membrane 11 and the second polymer electrolyte membrane 12 is a membrane having the same configuration as the polymer electrolyte membrane 10 shown in FIG. 1. Next, the inner reinforcing film 80 shown in FIG. 11 will be explained in detail with reference to FIG. 12. FIG. 12 is an essential portion enlarged front view showing one example of the basic configuration of the inner reinforcing film 80 included in the membrane-membrane reinforcing member assembly 1A shown in FIG. 11.

The inner reinforcing film 80 is constituted of a resin film. As shown in FIG. 12, the inner reinforcing film 80 has a plurality of openings (through holes) 82 penetrating therethrough in a thickness direction. Polymer electrolyte composed of the same component as or the different component from the first polymer electrolyte membrane 11 and the second polymer electrolyte membrane 12 is filled in the openings 82. It is preferable that an area ratio (opening degree) of the openings 82 to the main surface of the inner reinforcing film 80 be 50% to 90%. If the opening degree is set to 50% or more, adequate ion conductivity can be obtained easily. Meanwhile, if the opening degree is set to 90% or less, adequate mechanical strength of the inner reinforcing film 80 can be obtained easily.

Further, the inner reinforcing film 80 may be an extended porous film (not shown: for example, "GORE-SELECT (II)" (Product Name) manufactured by Japan Gore-Tex, Inc.). As above, the openings 82 of the inner reinforcing film 80 may be very fine pore (pore diameter of several tens of μm for example). Even in this case, it is preferable that the opening degree (porosity) be 50% to 90% due to the same reason as described above.

In light of the chemical stability and the mechanical stability, the resin constituting the inner reinforcing film 80 is preferably at least one synthetic resin selected from a group consisting of polytetrafluoroethylene, fluoroethylene-propylene copolymer, tetrafluoroethylene-perfluoro alkoxy ethylene copolymer, polyethylene, polypropylene, polyether amide, polyether imide, polyether ether ketone, polyether sulfone, polyphenylene sulfide, polyarylate, polysulfide, polyimide, polyethylene naphthalate, polyethylene terephthalate, and polyimide amide.

Moreover, the inner reinforcing film 80 may be configured to have the above-described openings such that at least one of fibrous reinforcing body particles and spherical reinforcing body particles are contained in the polymer electrolyte membrane 10 described above. One example of the material of the reinforcing body particles is the resin constituting the inner reinforcing film 80.

The method for manufacturing the polymer electrolyte-inner reinforcing film complex 10A is not especially limited, and it is possible to manufacture the polymer electrolyte-inner reinforcing film complex 10A using a known thin film manufacturing technique. The membrane-membrane reinforcing member assembly 1A can be manufactured by the same method as the membrane-membrane reinforcing member assembly 1 described above except that the polymer electrolyte-inner reinforcing film complex 10A is used.

Embodiment 3

In Embodiment 3 of the present invention, the second step P2 shown in FIG. 7 in the method for manufacturing the membrane-membrane reinforcing member assembly 1 of Embodiment 1 is carried out manually. To be specific, in the present embodiment, the tape-shaped membrane reinforcing members 136A and 136B are manually cut to have a predetermined length and attached to one main surface of the membrane-membrane reinforcing member laminate 141 obtained by attaching the membrane reinforcing member 142A and the membrane reinforcing member 142B to the side end portions of one main surface of the polymer electrolyte membrane 140 in FIG. 7. Except for this, Embodiment 3 is the same as Embodiment 1. Instead of the polymer electrolyte membrane 10 of Embodiment 1, the polymer electrolyte membrane-inner reinforcing film complex 10A of Embodiment 2 may be used.

In accordance with the present embodiment, it is possible to, at least, mass produce the membrane-membrane reinforcing member laminate 141, the membrane-catalyst layer assembly 2 and membrane-electrode assembly 3, and reduce the manufacturing cost compare to before.

EXAMPLES

Hereinafter, the present invention will be further explained in detail using Example and Comparative Example. However, the present invention is not limited to the following Examples.

Example 1

In the present Example, first, the membrane-membrane reinforcing member assembly of the present invention having the configuration shown in FIG. 1 was manufactured.

The first membrane reinforcing members 22 and 24 and the second membrane reinforcing members 26 and 28 were disposed on both surfaces of the polymer electrolyte membrane 10 (polymer electrolyte membrane made of commercially available perfluoro carbon sulfonic acid, 150 mm×150 mm, thickness of 40 μm) so as to be located at positions similar to the positions shown in FIG. 1.

As each of the first membrane reinforcing members 22 and 24 and the second membrane reinforcing members 26 and 28, a tape-shaped thin film (thickness of 20 μm) made of PEN (polyethylene naphthalate) was used.

Next, the membrane-catalyst layer assembly of the present invention having the configuration shown in FIG. 2 was manufactured using the membrane-membrane reinforcing member assembly obtained as above.

A cathode forming ink was prepared by dispersing, in a mixed dispersion medium of ethanol and water (mass ratio of 1:1), catalyst supporting carbon (TEC10E50E manufactured by Tanaka Kikinzoku Kogyo K.K., 50 mass % thereof is Pt) in which platinum particles that are electrode catalyst are supported on carbon powder, and a polymer electrolyte solution (Flemion manufactured by Asahi Glass Co., Ltd.) having hydrogen ion conductivity.

Moreover, an anode catalyst layer forming ink was prepared by dispersing, in a mixed dispersion medium of ethanol and water (mass ratio of 1:1), catalyst supporting carbon (TEC61E54 manufactured by Tanaka Kikinzoku Kogyo K.K., 50 mass % thereof is Pt—Ru alloy) in which platinum ruthenium alloy (platinum:ruthenium=1:1.5 mole ratio (mass ratio)) particles that are electrode catalyst are supported on carbon powder, and a polymer electrolyte solution (Flemion manufactured by Asahi Glass Co., Ltd.) having hydrogen ion conductivity.

The obtained cathode catalyst layer forming ink was applied to one surface of the above-described polymer electrolyte membrane by the spraying method, and a cathode catalyst layer having the platinum supporting amount of 0.6 mg/cm$^2$ and the size of 140 mm×140 mm was formed so as to be located at a position similar to the position shown in FIG. 2.

Further, the obtained anode catalyst layer forming ink was applied to a surface of the above-described polymer electrolyte membrane which surface is opposite the surface on which the cathode catalyst layer is formed by the spraying method, and an anode catalyst layer having the platinum supporting amount of 0.35 mg/cm$^2$ and the size of 140 mm×140 mm was formed so as to be located at a position similar to the position shown in FIG. 2.

Thus, the membrane-catalyst layer assembly was formed by forming the anode catalyst layer and the cathode catalyst layer.

Next, the membrane-electrode assembly having the configuration shown in FIG. 3 was manufactured using the membrane-catalyst layer assembly obtained as above.

To form the gas diffusion layer, carbon paper having the size of 200 mm×200 mm and the thickness of 100 μm was immersed in aqueous dispersion containing fluorocarbon resin, and then the carbon paper was dried. Thus, the water repellency was given to the carbon cloth (water repellent finish)

Next, a water-repellent carbon layer was formed on one surface (entire surface) of the carbon paper which was subjected to the water repellent finish. A water-repellent carbon layer forming ink was prepared by mixing electrically-conductive carbon powder (Denka Black (Product Name) manufactured by Denki Kagaku Kogyo Kabushiki Kaisha) and aqueous solution (D-1 manufactured by Daikin Industries, Ltd.) in which polytetrafluoroethylene (PTFE) fine powder was dispersed. The water-repellent carbon layer forming ink was applied by the doctor blade method to one surface of the carbon paper which was subjected to the water repellent finish. Thus, the water-repellent carbon layer was formed. Here, part of the water-repellent carbon layer was embedded in the carbon paper.

Then, the carbon paper which was subjected to the water repellent finish and on which the water-repellent carbon layer was formed was burned for thirty minutes at 350 degrees C. that is a temperature equal to or higher than the melting point of PTFE. Lastly, a center portion of the carbon paper was cut with a cutting die. Thus, the gas diffusion layer having the size of 142.5 mm×142.5 mm was obtained.

Next, two gas diffusion layers sandwich the above-described membrane-catalyst layer assembly such that the center portion of the water-repellent carbon layer of the gas diffusion layer obtained as above contacted the cathode catalyst layer and the anode catalyst layer. Then, these were subjected to the thermocompression bonding (120 degrees C., thirty minutes, 10 kgf/cm$^2$) using a hot pressing device. Thus, the membrane-electrode assembly of the present invention was obtained such that these two gas diffusion layers were located at positions similar to the positions shown in FIG. 3.

Lastly, a polymer electrolyte fuel cell (unit cell 1) of the present invention having the configuration shown in FIG. 4 was manufactured using the membrane-electrode assembly of the present invention obtained as above.

The membrane-electrode assembly was sandwiched between a separator plate having a gas passage for supplying the fuel gas and a cooling water passage and a separator plate having a gas passage for supplying the oxidizing gas and a cooling water passage and gaskets made of fluorocarbon rubber were disposed around the cathode and the anode between the separator plates. Thus, a unit cell (polymer electrolyte fuel cell of the present invention) was obtained, in which an effective electrode area (effective electrode area of the anode or the cathode) was 196 cm$^2$.

Comparative Example 1

Figure 13:
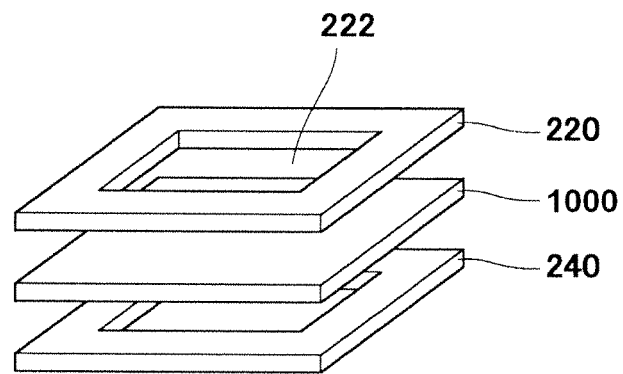
FIG. 13 is an essential portion exploded perspective view for explaining a positional relation between a solid polymer electrolyte membrane and fluororesin sheets (protective films) in the polymer electrolyte fuel cell described in Patent Document 1.

The membrane-reinforcing member assembly, the membrane-catalyst layer assembly, the membrane-electrode assembly and the unit cell (unit cell 2) were manufactured in the same manner as in Example 1 except that the frame-shaped protective films 220 and 240 (herein, these membranes are made of PEN as with Example 1) shown in FIG. 13 were disposed instead of the first membrane reinforcing members 22 and 24 and the second membrane reinforcing members 26 and 28.

Evaluation Test (1) Aging (Activation Treatment)

The unit cell 1 obtained in Example 1 and the unit cell 2 obtained in Comparative Example 1 were controlled to be 64 degrees C., a hydrogen gas was supplied as a fuel gas to the gas passage on the anode side, and air was supplied to the gas passage on the cathode side. Here, the hydrogen gas and the air were supplied to the unit cell after the hydrogen gas utilization ratio was set to 70%, the air utilization ratio was set to 55%, and the hydrogen gas and the air were humidified so as to each have the dew point of about 64 degrees C. Then, the aging was carried out such that the unit cell was driven for twelve hours at the current density of 0.2 A/cm$^2$.

(2) Cell Output Characteristics Evaluation Test 1

The unit cell of Example 1 and the unit cell of Comparative Example 1 were subjected to a rating endurance test carried out under a condition similar to actual driving of a fuel cell.

In the rating endurance test, each unit cell was driven under the same condition as the aging except that the current density was set to 0.16 A/cm$^2$, and a mixed gas of hydrogen and carbon dioxide (volume ratio of 3:1) was supplied to the gas passage on the anode side such that the hydrogen gas utilization ratio became 75%. Then, the output voltage was recorded twelve hours later.

(3) Cell Output Characteristics Evaluation Test 2

The unit cell of Example 1 and the unit cell of Comparative Example 1 were subjected to an acceleration endurance test which can determine the life in a short period of time by accelerating the deterioration of the membrane-electrode assembly.

In the acceleration endurance test, each unit cell was driven under the same condition as the above cell output characteristics evaluation test 1 (rating endurance test) except that the unit cell 1 obtained in Example 1 and the unit cell 2 obtained in Comparative Example 1 were controlled to be 90 degrees C. Then, the output voltage was recorded twelve hours later. Note that the unit cell 1 and the unit cell 2 were controlled to be 90 degrees C. using a heater.

TABLE 1

|  | Example 1 | Comparative Example 1 |
| --- | --- | --- |
| Cell Output Characteristics Evaluation Test 1 | 0.665 V | 0.655 V |
| Cell Output Characteristics Evaluation Test 2 | 0.791 V | 0.779 V |

As is clear from the results shown in Table 1, Example 1 has substantially the same cell output characteristics as Comparative Example 1.

The foregoing explained the embodiments of the present invention in detail. However, the present invention is not limited to the above embodiments.

For example, the above embodiments of the present invention explained the mode in which the outer peripheral portion (edge) of the membrane reinforcing member (for example, the first membrane reinforcing members 22 and 24 shown in FIG. 1) coincides with the peripheral portion (edge) of the polymer electrolyte membrane (for example, the polymer electrolyte membrane 10 shown in FIG. 1) (mode in which the outer edge of the membrane reinforcing member and the edge of the polymer electrolyte membrane overlap each other and the edge of the polymer electrolyte membrane does not project when viewed from substantially the normal direction of the main surface of the polymer electrolyte membrane). However, the present invention is not limited to this. In the present invention, for example, the edge of the membrane reinforcing member may entirely or partially project from the edge of the polymer electrolyte membrane as long as the effects of the present invention can be obtained. Moreover, the edge of the polymer electrolyte membrane may entirely or partially project from the edge of the membrane reinforcing member as long as the effects of the present invention can be obtained.

From the foregoing explanation, many modifications and other embodiments of the present invention are obvious to on skilled in the art. Therefore, the foregoing explanation should be interpreted only as an example, and is provided for the purpose of teaching the best mode for carrying out the present invention to one skilled in the art. The structures and/or functional details may be substantially modified within the spirit of the present invention.

INDUSTRIAL APPLICABILITY

The membrane-reinforcing member assembly, the membrane-catalyst layer assembly and the membrane-electrode assembly of the present invention are useful as parts of the polymer electrolyte fuel cell which can be mass produced.

The polymer electrolyte fuel cell of the present invention is expected to be preferably utilized as a main power source or an auxiliary power source of, for example, a moving body, such as an automobile, and a distributed (on-site) power generating system (cogeneration system for domestic use).

The method for manufacturing the membrane-reinforcing member assembly of the present invention, the method for manufacturing the membrane-catalyst layer assembly of the present invention and the method for manufacturing the membrane-electrode assembly of the present invention are useful as the methods used in the method for manufacturing the polymer electrolyte fuel cell which can be mass produced.

The method for manufacturing the polymer electrolyte fuel cell of the present invention is useful as the method for manufacturing the polymer electrolyte fuel cell preferably utilized as the main power source or the auxiliary power source of, for example, a moving body, such as an automobile, and a distributed (on-site) power generating system (cogeneration system for domestic use).

The invention claimed is:

1. A method for manufacturing a membrane-membrane reinforcing member assembly, comprising steps of:
   (A) disposing a pair of first membrane reinforcing members, on portions, respectively, extending along a pair of opposed sides of four sides of a first main surface and a second main surface of a polymer electrolyte membrane, the first main surface and the second main surface facing face each other and respectively having a substantially rectangular shape, each of the pair of first membrane reinforcing members having a main surface smaller than the first main surface and having a film shape; and
   (B) disposing a pair of second membrane reinforcing members, each having a main surface smaller than the second main surface and having a film shape, on portions, respectively, extending along a pair of opposed sides of four sides of the second main surface, wherein:
   in said steps A and B, said pair of first membrane reinforcing members and said pair of second membrane reinforcing members are disposed so as to extend along four sides as a whole, respectively, of the polymer electrolyte membrane and so as to sandwich four corners of the polymer electrolyte membrane,
   said step A includes: a step of preparing a roll of the polymer electrolyte membrane having a tape shape and rolls of said two first membrane reinforcing members each having a tape-shape; a step of pulling out the tape-shaped polymer electrolyte membrane and the two tape-shaped first membrane reinforcing members from the respective rolls and joining the two first membrane reinforcing members to side end portions, respectively, of the first main surface of the tape-shaped polymer electrolyte membrane; and a step of cutting the tape-shaped polymer electrolyte membrane, to the side end portions of which the two tape-shaped first membrane reinforcing members are joined, into pieces each having a predetermined length, the pair of first membrane reinforcing members and the pair of second membrane reinforcing members are made of at least one type of synthetic resin selected from a group consisting of polyethylene naphthalate, polyethylene terephthalate, fluoroethylene-propylene copolymer, tetrafluoroethylene-perfluoro alkoxy ethylene copolymer, polyethylene, polypropylene, polyether amide, polyether imide, polyether ether ketone, polyether sulfone, polyphenylene sulfide, polyarylate, polysulfide, polyimide, and polyimide amide, and the pair of first membrane reinforcing members or the pair of second membrane reinforcing members are disposed only at the pair of opposed sides of four sides of the first main surface, or the second main surface respectively.

2. The method according to claim 1, wherein an inner reinforcing film having a through hole that is an ion conduction path is disposed within the polymer electrolyte membrane.

3. A method for manufacturing a membrane-catalyst layer assembly, comprising steps of:
manufacturing a membrane-membrane reinforcing member assembly by the method according to claim 1;
(C) after the step of manufacturing a membrane-membrane reinforcing member assembly, disposing a first catalyst layer on at least part of a region of the first main surface of the polymer electrolyte membrane of the membrane-membrane reinforcing member assembly on which region the first membrane reinforcing member is not disposed; and
(D) after the step of manufacturing a membrane-membrane reinforcing member assembly, disposing a second catalyst layer on at least part of a region of the second main surface of the polymer electrolyte membrane of the membrane-membrane reinforcing member assembly on which region the second membrane reinforcing member is not disposed.

4. A method for manufacturing a membrane-electrode assembly, comprising steps of:
manufacturing a membrane-catalyst layer assembly by the method according to claim 3;
(E) after the step of manufacturing a membrane-catalyst layer assembly, disposing a first gas diffusion layer to cover the first catalyst layer of the membrane-catalyst layer assembly; and
(F) after the step of manufacturing a membrane-catalyst layer assembly, disposing a second gas diffusion layer to cover the second catalyst layer of the membrane-catalyst layer assembly.

5. The method according to claim 4, wherein:
in said step E, the first gas diffusion layer is disposed so as to cover the first catalyst layer and at least part of the first membrane reinforcing member; and
in said step F, the second gas diffusion layer is disposed so as to cover the second catalyst layer and at least part of the second membrane reinforcing member.

6. A method for manufacturing a polymer electrolyte fuel cell, comprising the step of manufacturing a membrane-electrode assembly by the method according to claim 4.

* * * * *